US009853965B2

(12) United States Patent
Yin et al.

(10) Patent No.: US 9,853,965 B2
(45) Date of Patent: Dec. 26, 2017

(54) AUTHENTICATION SERVICE FOR THIRD PARTY APPLICATIONS

(71) Applicant: Verizon Patent and Licensing Inc., Arlington, VA (US)

(72) Inventors: Fenglin Yin, Lexington, MA (US); Jianxiu Hao, Acton, MA (US); Zhong Chen, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 210 days.

(21) Appl. No.: 14/833,361

(22) Filed: Aug. 24, 2015

(65) Prior Publication Data
US 2017/0063838 A1   Mar. 2, 2017

(51) Int. Cl.
*H04L 29/06* (2006.01)
*H04W 12/06* (2009.01)

(52) U.S. Cl.
CPC ......... *H04L 63/0823* (2013.01); *H04W 12/06* (2013.01); *H04L 63/0442* (2013.01); *H04L 63/062* (2013.01); *H04L 63/0876* (2013.01)

(58) Field of Classification Search
None
See application file for complete search history.

(56) References Cited

U.S. PATENT DOCUMENTS

| 9,319,223 B2 * | 4/2016 | Nix | G06F 21/35 |
| 9,641,520 B2 * | 5/2017 | Neuman | H04L 63/0853 |
| 2009/0132813 A1 * | 5/2009 | Schibuk | G06Q 20/223 713/158 |
| 2010/0299313 A1 * | 11/2010 | Orsini | H04L 9/085 707/652 |
| 2011/0202755 A1 * | 8/2011 | Orsini | H04L 63/029 713/151 |

(Continued)

OTHER PUBLICATIONS

Sultana, Nahar; Choi, Ki Moon; Huh, Eui-Nam. Application Driven Cluster Based Group Key Management with Identifier in Mobile Wireless Sensor Network. Future Generation Communication and Networking (FGCN 2007). http://ieeexplore.ieee.org/stamp/stamp.jsp?arnumber=4426148.*

(Continued)

*Primary Examiner* — Jeremiah Avery

(57) ABSTRACT

An authentication device receives, from an application executing at a mobile device, a request for an authentication token, the request including an application identifier and an encrypted session identifier (SID). The application identifier identifies the application and the SID uniquely identifies a session between the application and a destination network device. The authentication device decrypts, using a first private key of a first public/private key pair, the encrypted SID to produce a decrypted SID; and determines a first hash value of certain data that includes the application identifier and session information associated with the session. The authentication device further encrypts, using a second public key of a second public/private key pair, the determined first hash value and the decrypted SID to produce an authentication token comprising the encrypted first hash value and the SID; and sends the authentication token to the application at the mobile device.

20 Claims, 20 Drawing Sheets

(56) References Cited

U.S. PATENT DOCUMENTS

| | | | | |
|---|---|---|---|---|
| 2011/0258439 A1* | 10/2011 | Orsini | .................... | H04L 9/085 |
| | | | | 713/165 |
| 2012/0204032 A1* | 8/2012 | Wilkins | ................. | H04L 9/006 |
| | | | | 713/170 |
| 2013/0262857 A1* | 10/2013 | Neuman | ................. | H04L 63/08 |
| | | | | 713/155 |
| 2013/0282588 A1* | 10/2013 | Hruska | ................. | G06Q 20/10 |
| | | | | 705/67 |
| 2015/0143125 A1* | 5/2015 | Nix | ................... | H04W 52/0235 |
| | | | | 713/171 |
| 2016/0072775 A1* | 3/2016 | Choi | ................... | H04L 63/0428 |
| | | | | 713/171 |

OTHER PUBLICATIONS

Zegers, William; Chang, Sang-Yoon; Park, Younghee; Gao, Jerry. A Lightweight Encryption and Secure Protocol for Smartphone Cloud. 2015 IEEE Symposium on Service-Oriented System Engineering (SOSE). http://ieeexplore.ieee.org/stamp/stamp.jsp?arnumber=7133539.*

Yang, Lijun; Ding, Chao; Wu, Meng. Establishing Authenticated Pairwise Key using Pairing-based Cryptography for Sensor Networks. 2013 8th International ICST Conference on Communications and Networking in China (CHINACOM). http://ieeexplore.ieee.org/stamp/stamp.jsp?arnumber=6694650.*

\* cited by examiner

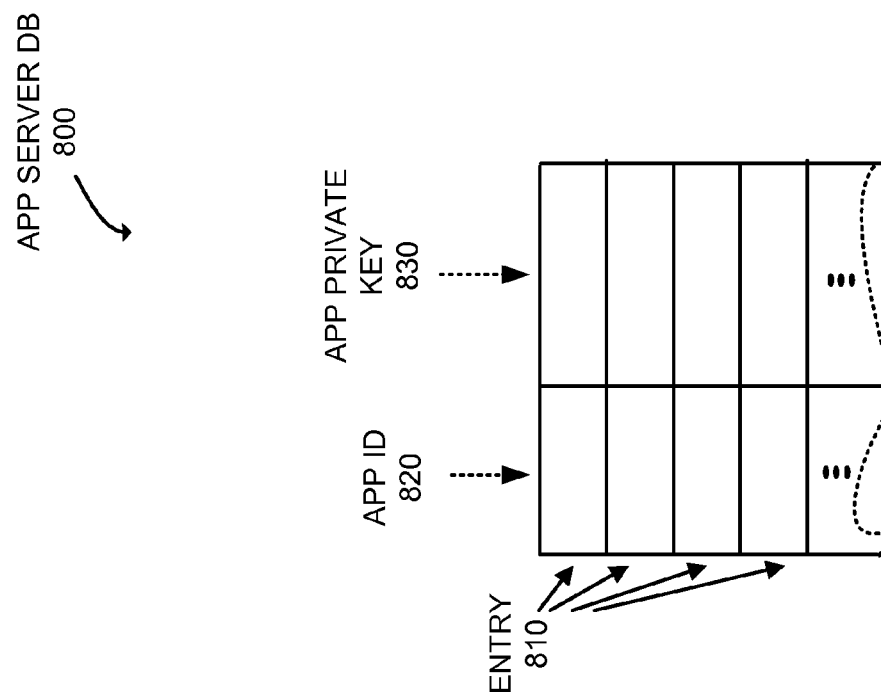

AUTHENTICATION SERVICE FOR THIRD PARTY APPLICATIONS

BACKGROUND

A virtual Internet service provider (VISP) is an entity that offers one or more Internet services under its own company or brand name, while actually using the equipment and facilities of another Internet service provider (ISP) to provide those services. In some circumstances, a VISP offers the same services as a regular ISP, such as web hosting, email, and domain name provisioning. The VISP purchases services from another ISP, sometimes called a "wholesale ISP," that allows the VISP's customers to access the one or more Internet services that are owned and operated by the wholesale ISP.

BRIEF DESCRIPTION OF THE DRAWINGS

FIG. 8 is a diagram that depicts an exemplary implementation of the application server database of FIG. 1;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein provide a VISP authentication service for third party applications, installed and executed at mobile devices, based on the mobile devices' network Internet Protocol (IP) connection session. When mobile devices connect, and receive IP service, via a cellular network (e.g., 4G Long Term Evolution (LTE)), the authentication service described herein enables authentication of IP connection sessions between application servers, owned and operated by third parties, and third party applications installed at the mobile devices. The third party applications may be offered for downloading, and installation at the mobile devices, by the third parties. The authentication service extends Universal Integrated Circuit Card (UICC) or Subscriber Identity Module (SIM) based mobile subscriber authentication and authorization based on the establishment of an IP connection session via a packet gateway of the cellular network. In an implementation in which the cellular network includes the 4G LTE network, the IP session from the mobile device via a LTE packet gateway has a limited lifetime, and the mobile device's IP address changes from one session to a next session. Therefore, third party application servers cannot use the authentication service described herein for tracking mobile devices, thereby, maintaining confidentiality between the mobile devices and the third party application servers.

Figure 1:
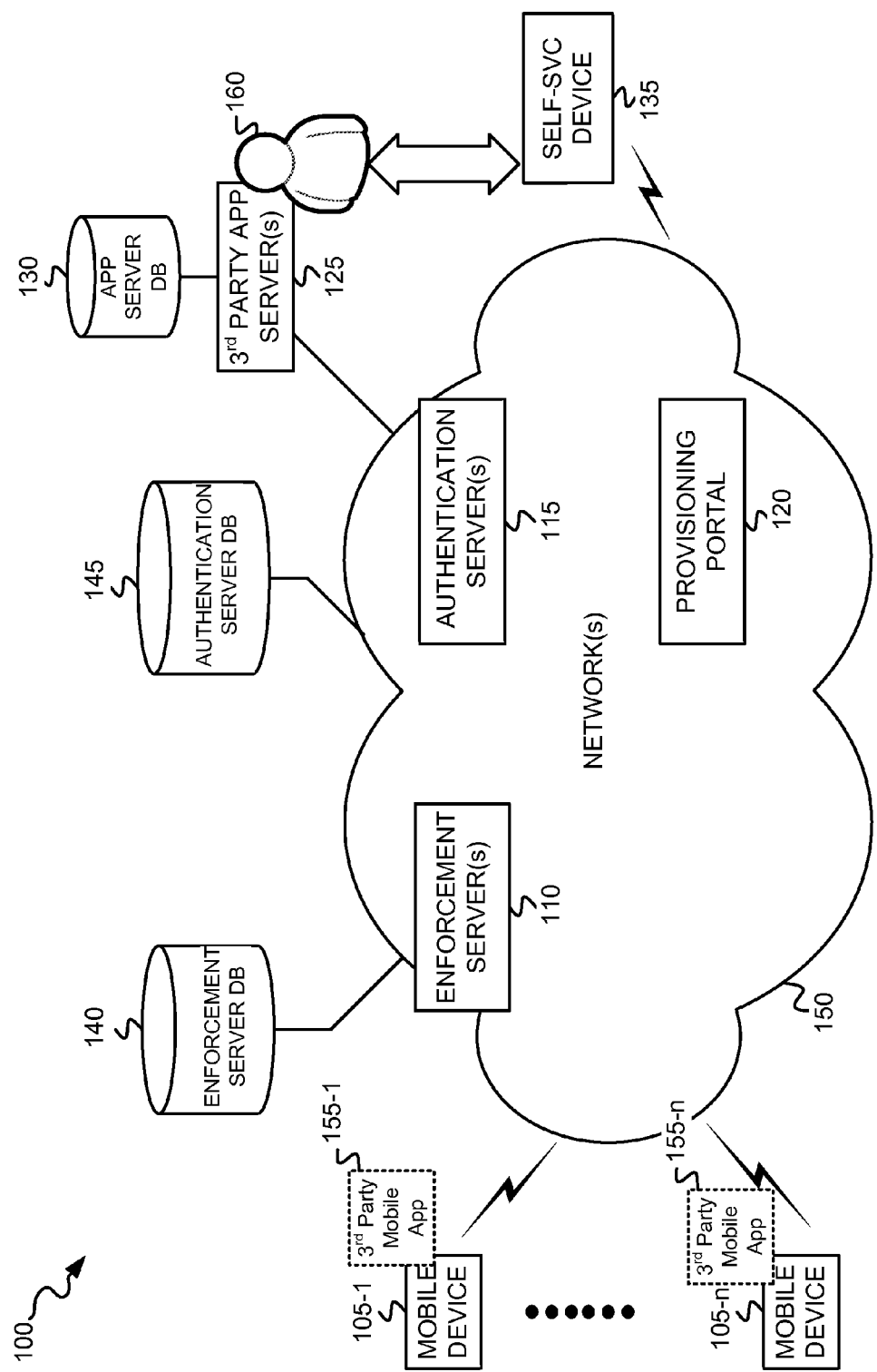
FIG. 1 is a diagram that depicts an exemplary network environment in which a VISP authentication service is implemented for authenticating communication sessions between third party mobile applications, executing at mobile devices, and third party application servers.

FIG. 1 is a diagram that depicts an exemplary network environment 100 in which a VISP authentication service is implemented for authenticating communication sessions between third party mobile applications, executing at mobile devices, and third party application (app) servers. As shown, network environment 100 includes multiple mobile devices 105-1 through 105-n (where n is a positive integer greater than or equal to one), an enforcement server(s) 110, an authentication server(s) 115, a provisioning portal 120, a third (3rd) party app server(s) 125, an app server database (DB) 130, a self-service (svc) device 135, an enforcement server DB 140, an authentication server DB 145, and a network 150.

Mobile devices 105-1 through 105-n (generically referred to herein as "mobile device 105" or "mobile devices 105") may each include any type of electronic device that includes one or more wireless transceivers capable of communicating via network 150. The one or more wireless transceivers may include a wireless transceiver capable of communicating with a cellular network via cellular network protocols (e.g., via 4G LTE). The one or more wireless transceivers may further include, for example, a wireless transceiver capable of communicating via Wi-Fi (IEEE 802.11 standard), and/or a wireless transceiver capable of communicating via a short range wireless protocol such as, for example, Bluetooth, Insteon, Infrared Data Association (IrDA), Wireless USB, Z-Wave, ZigBee, and/or a Body Area Network (BAN).

Mobile device 105 may include, for example, a cellular telephone (e.g., a smart phone); a wearable computer device (e.g., a wrist watch, glasses, etc.); a personal digital assistant (PDA); a palmtop, laptop, or tablet computer; a media playing device; a game playing device, or a digital camera device. Mobile devices 105-1 through 105-n may each store and execute a respective third party mobile app 155-1 through 155-n (generically referred to herein as "3rd party mobile app 155" or "3rd party mobile apps 155"). Third party mobile apps 155 may execute processes that involve an IP connection session between mobile device 105 and third party app server(s) 125. Mobile devices 105 may download a respective third party mobile app 155 from a remote network device such as, for example, third party app server(s) 125, and may install app 155 for execution. Third party mobile apps 155-1 through 155-n may each include any type of application, the execution of which involves communicating, via an IP connection session, with third party app server(s) 125.

Enforcement server(s) 110 includes one or more network devices that connects to network 150 and which acts as a "go between" for controlling a session between mobile device 105 and third party app server(s) 125. Enforcement server(s) 110 maintains the contents of Enforcement Server (ES) provisioning table 600 (FIG. 6 below) and ES device session record table 700 (FIG. 7 below), including collecting and storing session related data, such as the session related data described with respect to the process of FIGS. 11A and 11B below.

Authentication server(s) 115 includes one or more network devices that connects to network 150 and which operates to perform the VISP authentication service described herein, involving the exemplary processes described with respect to FIGS. 9A-9C, 11A-11B, and 13A-13C.

Provisioning portal 120 includes one or more network devices that enables the subscribing to, and the provisioning of, the VISP authentication service described herein. App server owner 160 may use self-service device 135 to subscribe to the VISP authentication service via provisioning portal 120. Third party app server(s) 125 includes one or more network devices that communicate with third party mobile app 155 executing at a mobile device 105 for purposes of exchanging certain data related to functionality performed by third party mobile app 155. App server owner 160 includes an individual or entity (e.g., company) that owns and operates third party app server(s) 125.

App server DB 130 includes one or more network devices that store a DB that associates an app ID, assigned to a specific third party mobile app executing at a mobile device 105, with a private key that is a component of a public/private key pair (app-pubkey/app-privkey). FIG. 8 (described below) depicts an exemplary implementation of app server DB 130.

Self-svc device 135 includes any type of device that includes a transceiver for communicating via network 150 (e.g., with provisioning portal 120). Self svc device 135 may include, for example, a cellular telephone (e.g., a smart phone); a wearable computer device; a personal digital assistant (PDA); a desktop, palmtop, laptop, or tablet computer; a media playing device; a game playing device; or a digital camera device. App server owner 160 may use self-svc device 135 for communicating with provisioning portal 120 for subscribing to the authentication service described herein, and for providing the information necessary for provisioning the authentication service for mobile devices 105 communicating with third party app server(s) 125.

Figure 7:
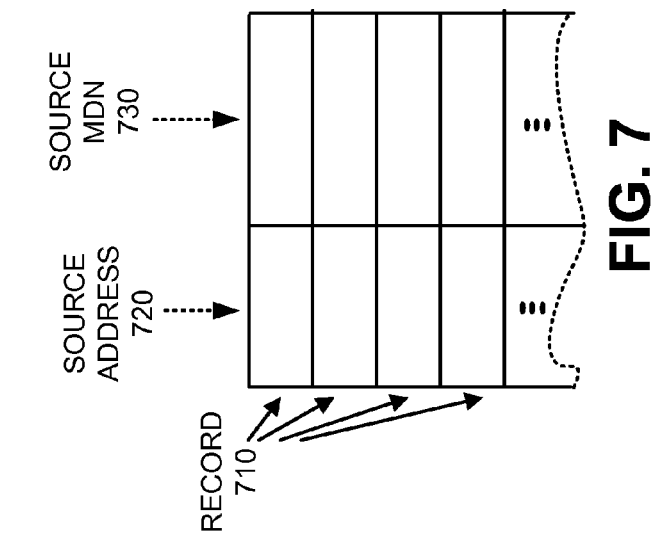
FIG. 7 is a diagram that depicts an exemplary implementation of an enforcement server device session record table of the enforcement server database of FIG. 1.
Figure 6:
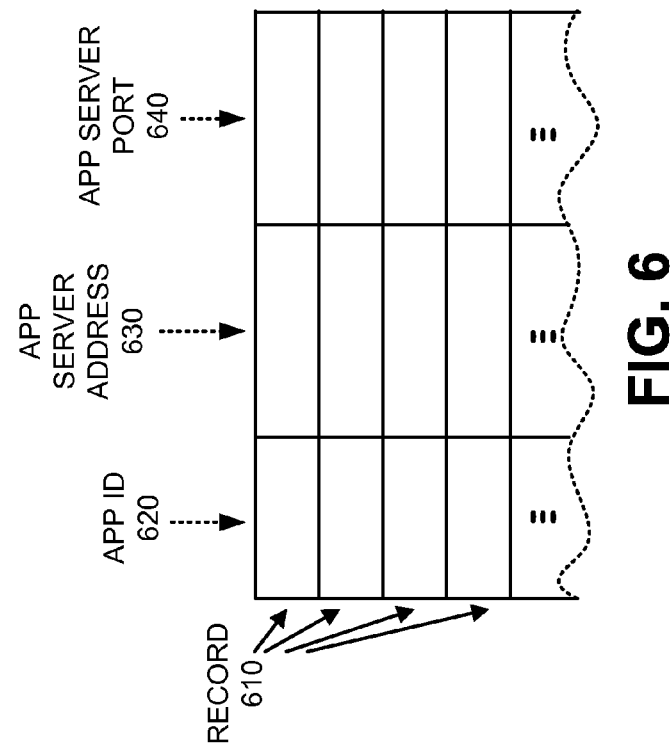
FIG. 6 is a diagram that depicts an exemplary implementation of an enforcement server provisioning table of the enforcement server database of FIG. 1.

Enforcement server DB 140 includes one or more network devices that store a DB that further stores at least two data structures, including an enforcement server (ES) provisioning table 600, described below with respect to FIG. 6, and an ES device session record table 700, described below with respect to FIG. 7. The ES provisioning table 600 stores records that associate an application ID (app-ID) with a network address and port of a particular third party app server 125. FIG. 6 (described below) depicts an exemplary implementation of ES provisioning table 600. The ES device session record table 700 stores records that associate a network address of a mobile device 105 with a Mobile Directory Number (MDN) of the same mobile device 105. FIG. 7 (described below) depicts an exemplary implementation of ES device session record table 700.

Authentication server DB 145 includes one or more network devices that store a DB that further stores at least two data structures, including an authentication server (AS) provisioning table 400, described below with respect to FIG. 4, and an AS device session record table 500, described below with respect to FIG. 5. The AS provisioning table 400 stores records that associate an application ID (app-ID) with a network address and port of a particular third party app server 125, a public key owned by app server owner 160, a public key certificate associated with the public key owned by app server owner 160, and a VISP public key and a VISP private key of a VISP public/private key pair assigned to the app-ID for use during authentication.

The AS device session record table 500 stores records that include data related to a session between mobile device 105 and a third party app server 125. The data stored in each record may include, for example, a network address and port of the third party app server 125, a network address and port of the mobile device 105, the MDN of the mobile device 105, and an application ID associated with the mobile app 155 executing at the mobile device 105.

Network 150 includes one or more networks of any type, such as, for example, a "Wi-Fi" network (i.e., a wireless network compatible with the IEEE 802.11 standard), a telecommunications network (e.g., a Public Switched Telephone Network (PSTN) or Public Land Mobile Network (PLMN)), a local area network (LAN), a wide area network (WAN), a metropolitan area network (MAN), an intranet, the Internet, a wireless satellite network, and/or a cable network (e.g., an optical cable network). The PLMN(s) may include a Code Division Multiple Access (CDMA) 2000 PLMN, a Global System for Mobile Communications (GSM) PLMN, a Long Term Evolution (LTE) PLMN (e.g., 4G LTE PLMN) and/or other types of PLMNs not specifically described herein.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though only a single third party app server 125, and a single app server owner 160, is depicted in FIG. 1, multiple third party app servers 125, each with its own app server owner 160, may exist in network environment 100. Each different third party app server 125 may be associated with a different third party mobile app 155.

Figure 2:
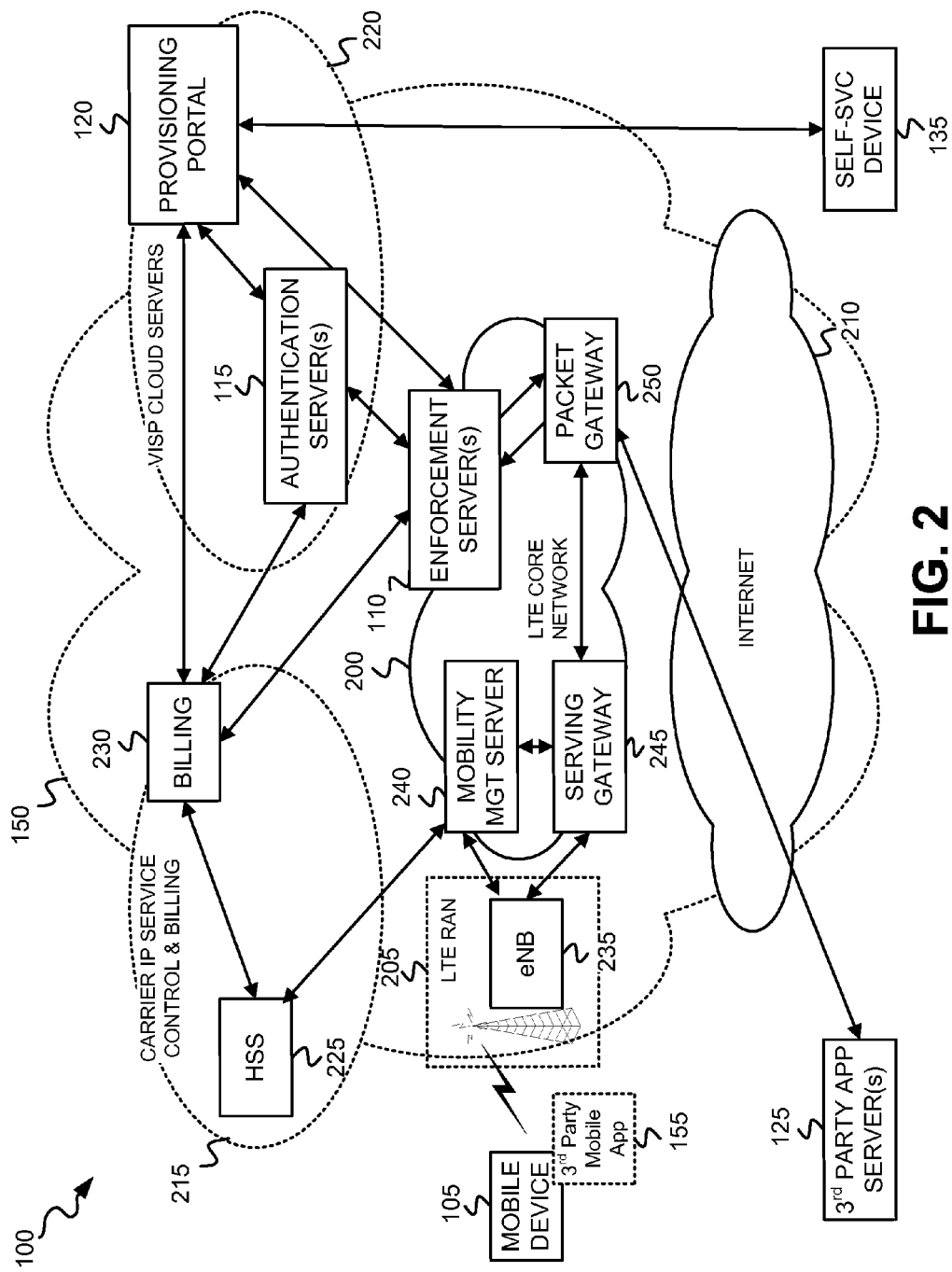
FIG. 2 is a diagram that depicts an exemplary overview of the subscription and provisioning associated with the VISP authentication service for authenticating sessions between the mobile device and the third party app server of FIG. 1.

FIG. 2 is a diagram that depicts an exemplary overview of the subscription and provisioning associated with the VISP authentication service, described herein, for authenticating sessions between mobile device 105 and third party app server(s) 125. As shown in FIG. 2, network 150 of network environment 100 may include a PLMN that further includes an LTE core network 200 and an LTE Radio Access Network (RAN) 205, the Internet 210, carrier IP service control and billing cloud components 215, and VISP cloud servers 220. LTE core network 200 further includes a mobility management server 240, a serving gateway 245, a packet gateway 250, and enforcement server(s) 110. VISP cloud servers 220 further include authentication server(s) 115 and provisioning portal 120. Carrier IP service control and billing components 215 include a Home Subscriber Server (HSS) 225 and a billing server 230.

As shown, LTE RAN 205 includes an eNodeB (eNB) 235 that further includes a base station for communicating over a wireless connection with mobile device 105. eNB 235 further connects to components of LTE core network 200, including connections to mobility management server 240 and serving gateway 245. Mobility management server 240 provides control plane functionality for mobile device mobility, and connects to HSS 225, serving gateway 245 and eNB 235. HSS 225 includes a central database that contains user-related and subscription-related information. HSS 225 performs various functions, including mobility management, call and session establishment support, and access authorization. Billing server 230 maintains billing information associated with the app owner (not shown in FIG. 2) of third party app server(s) 125.

Serving gateway 245 routes and forwards data packets to/from mobile device 105 and also acts as a mobility anchor during inter-eNodeB handovers. Packet gateway 250 provides connectivity from mobile device 105 to external packet data networks (e.g., the Internet) and acts as the exit and entry point of data traffic for mobile device 105. During a packet data (e.g., Internet Protocol (IP)) session between third party mobile app 155 and third party app server(s) 125, the data packets associated with the session may be transmitted from third party mobile app 155 to eNodeB 235 to serving gateway 245 to packet gateway 250, and on to third party app server(s) 125 (with data packets originating from third party app server(s) 125 associated with the session traveling in the opposite direction via the same nodes).

Referring to FIG. 2, during VISP authentication service subscription, a third party app owner (not shown), associated with third party app server(s) 125, uses self-service device 135 to communicate with provisioning portal 120 to subscribe to the VISP authentication service. The third party app owner provides, via self-service device 135, the app owner's public encryption key (app-pubkey) and public key certificate (cert-app-pubkey), and provides the network address (app-server-IP) and port (app-server-port) of third party app server(s) 125 for which the app owner is subscribing to the VISP authentication service. The app owner may provide additional information associated with establishing a subscription (e.g., third party mobile app information, company name, billing address, contact information, etc.). In response to the new subscription, provisioning portal 120 creates a unique application identifier (ID) for a third party mobile app 155 that is associated with third party app server(s) 125. Provisioning portal 120 further engages in VISP authentication service provisioning by interacting with authentication server(s) 115 to obtain a VISP public key, and to cause authentication server(s) 115 to create a record for the third party mobile app 155 in authentication server provisioning table 400 (as described below with respect to FIGS. 9A-9C) for future use during VISP authentication. Provisioning portal 120 also engages in VISP authentication service provisioning by interacting with enforcement server(s) 110 to cause enforcement server(s) 110 to create a record for the third party mobile app 155 (as also described below with respect to FIGS. 9A-9C) in ES provisioning table 600 for future use during VISP authentication.

Figure 3:
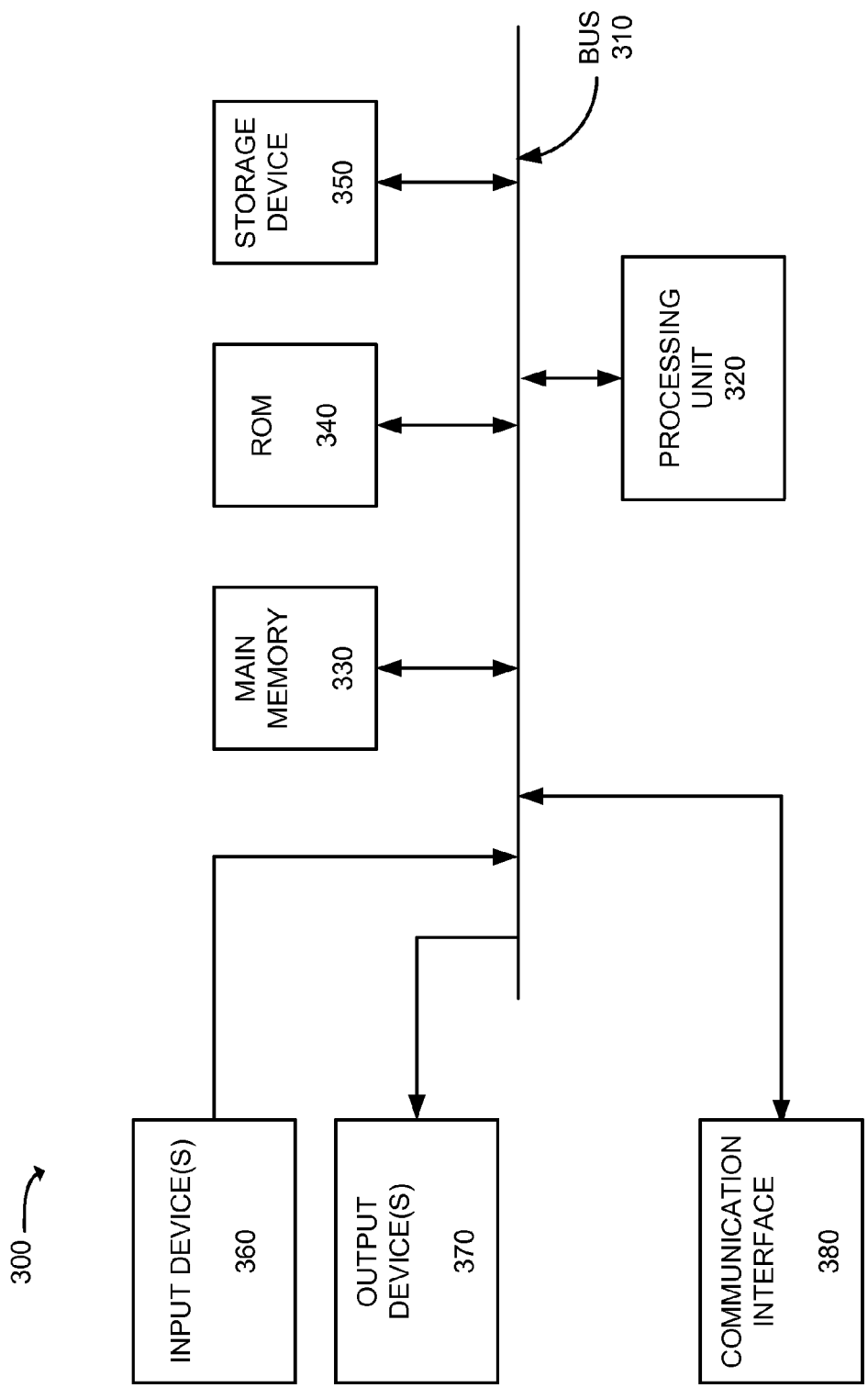
FIG. 3 is a diagram of exemplary components of a device that may correspond to the mobile device, the enforcement server, the authentication server, the provisioning portal, the app server, the app server database, the self service device, the enforcement server database and the authentication server database of FIG. 1.

FIG. 3 is a diagram of exemplary components of a device 300. Mobile device 105, enforcement server 110, authentication server 115, provisioning portal 120, app server 125, app server DB 130, self service device 135, enforcement server DB 140 and authentication server DB 145 may each include the same, or similar components, in a same or similar configuration to that depicted in FIG. 3. Device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of device 300.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit an operator to input information to device 300, such as, for example, a keypad or a keyboard, a touch panel display, voice recognition and/or biometric mechanisms, etc. Output device(s) 370 may include one or more mechanisms that output information to the operator, including a display, a speaker, etc. Communication interface 380 may include any transceiver mechanism that enables device 300 to communicate with other devices and/or systems. For example, communication interface 380 may include mechanisms for communicating with another device or system via a network, such as network 150.

Device 300 may perform certain operations or processes, as may be described in detail below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. Main memory 330, ROM 340, and storage device 350 may each be referred to herein as a "tangible non-transitory computer-readable medium."

The software instructions may be read into main memory 330 from another computer-readable medium, such as storage device 350, or read into main memory 330 from another device via communication interface 380. The software instructions contained in main memory 330 may cause processing unit 320 to perform operations or processes that will be described later. Alternatively, hardwired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only and other configurations may be implemented. Therefore, device 300 may include additional, fewer and/or different components, arranged in a different configuration, than depicted in FIG. 3. For example, if device 300 is a mobile device 105, then communication interface 380 of device 300 may include multiple communication interfaces, such as, for example, a first wireless transceiver that communicates using a low power, short range wireless protocol (e.g., Bluetooth, Insteon, IrDA, Wireless USB, Z-Wave, ZigBee, and/or a Body Area Network), and a second wireless transceiver that communicates using a Wi-Fi or a wireless cellular network protocol (e.g., LTE, CDMA, GSM, etc.).

Figure 4:
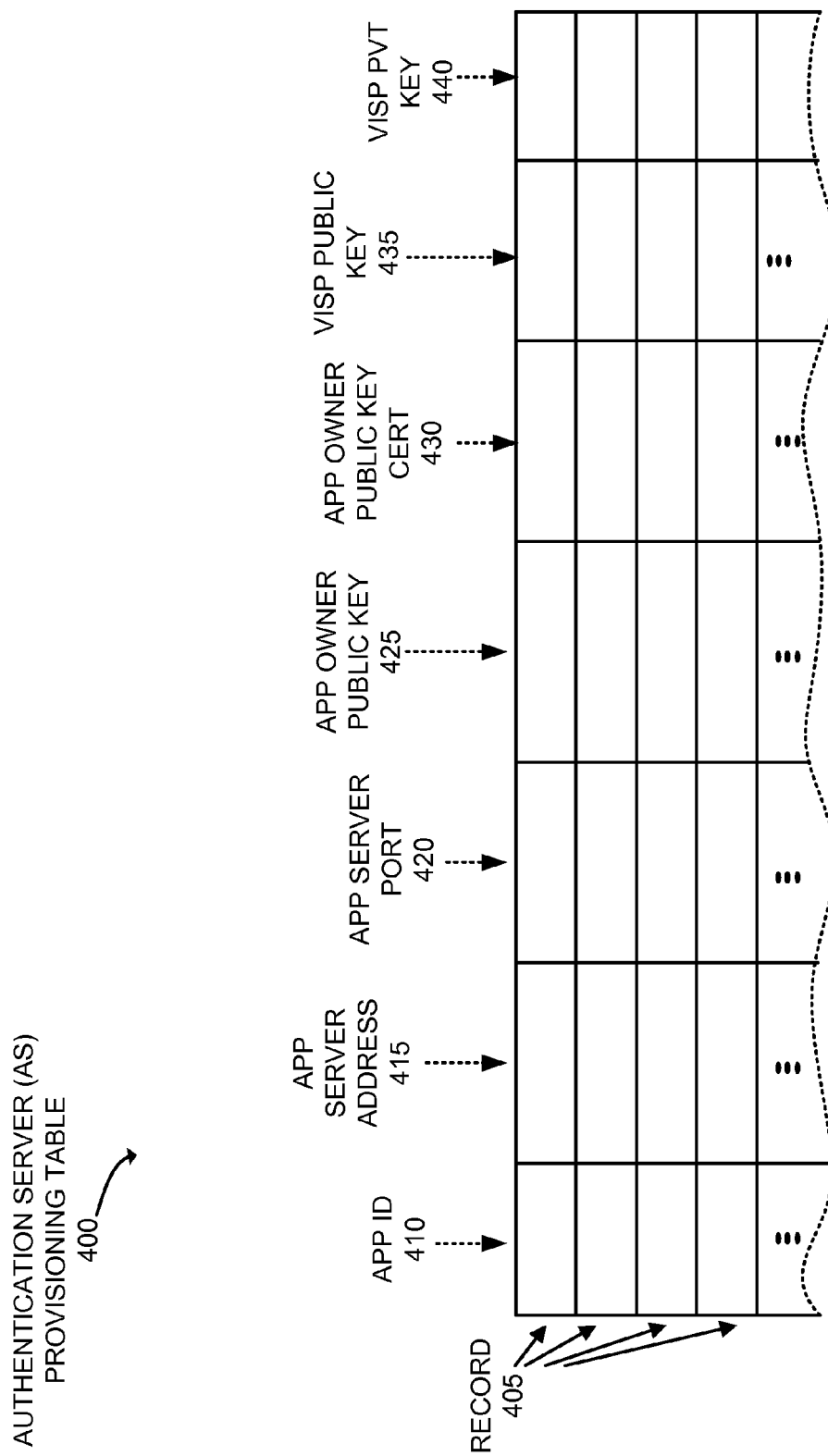
FIG. 4 is a diagram that depicts an exemplary implementation of an authentication server provisioning table of the authentication server database of FIG. 1.

FIG. 4 depicts an exemplary implementation of AS provisioning table 400, which may be stored in Authentication server DB 145. As shown, table 400 includes multiple records 405, each of which further includes an app identifier (ID) field 410, an app server address field 415, an app server port field 420, an app owner public key field 425, an app owner public key certificate field 430, a VISP public key field 435, and a VISP private key field 440.

App identifier (ID) field 410 stores a unique application ID that is assigned to a particular third party app server(s) 125 and a particular third party mobile app 155 by provisioning portal 120 upon app server owner 160 subscribing to the authentication service described herein.

App server address field 415 stores the network address (app-server-IP) of third party app server(s) 125. In one implementation, the network address may include an IP address of a network device in network 150. App server port field 420 stores the port identifier (app-server-port) associated with the network address stored in app server address field 415. App owner public key field 425 stores the public key (app-pubkey), of a public/private key pair, assigned to app server owner 160 of third party app server(s) 125. The public/private key pair may be used for encrypting and decrypting various communications during authentication service subscription, provisioning, and authentication. App owner public key certificate field 430 stores a digital certificate assigned to app server owner 160 and used for validating app server owner 160's ownership of the public key (app-pubkey). The digital certificate may include an electronic document, issued via a Public Key Infrastructure (PKI) system, that includes information about the public key, app server owner 160's identity, and the digital signature of the certificate authority (CA) that has verified the digital certificate's contents.

VISP public key field 435 stores a public key (visp-pubkey) of a public/private key pair generated by authentication server(s) 115 for authenticating IP connection sessions. VISP private key field 440 stores the private key (visp-privkey) of the public/private key pair generated by authentication server(s) 115.

Figure 5:
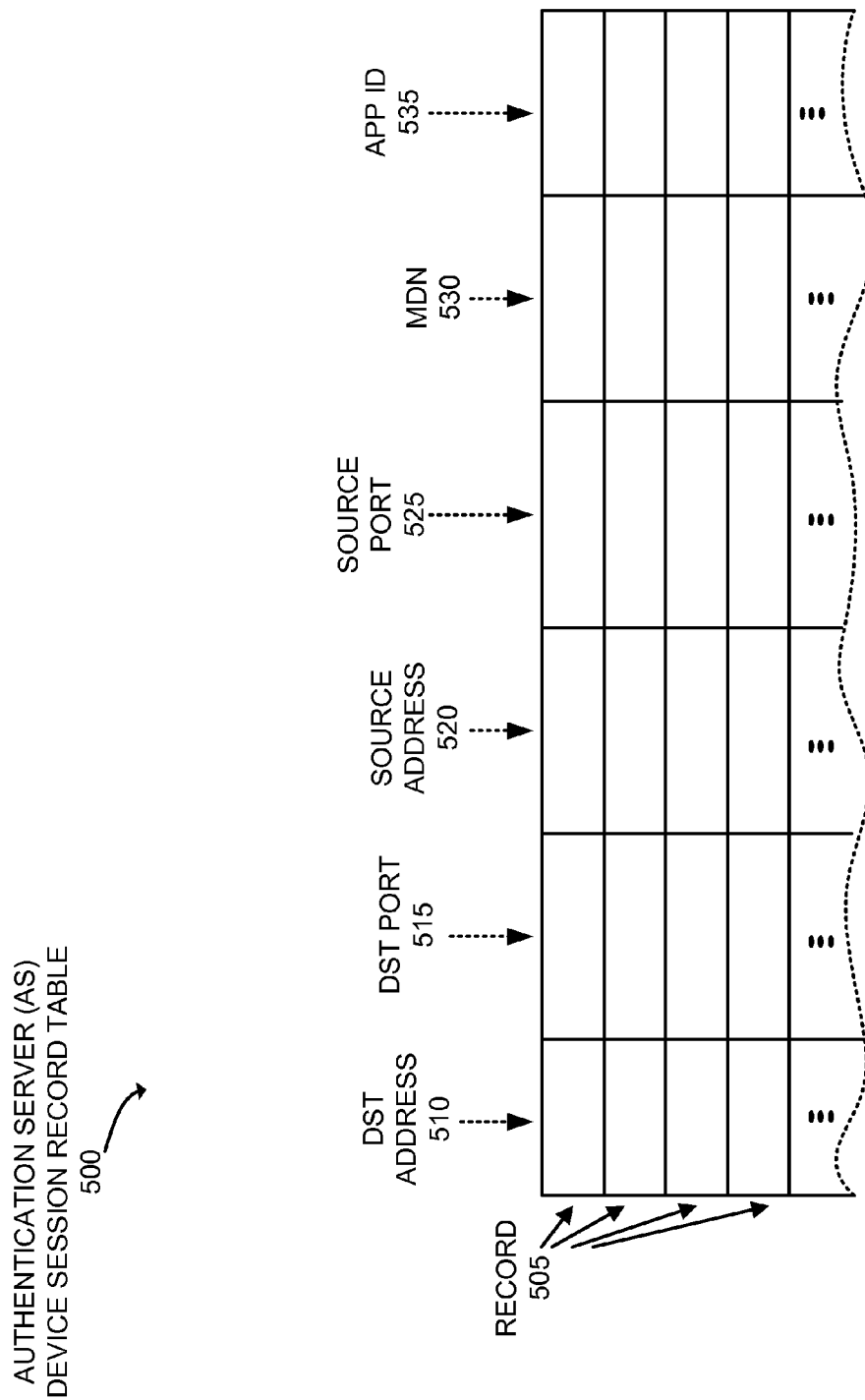
FIG. 5 is a diagram that depicts an exemplary implementation of an authentication server device session record table of the authentication server database of FIG. 1.

FIG. 5 depicts an exemplary implementation of AS device session record table 500, which may be stored in Authentication server DB 145. As shown, table 500 includes multiple records 505, each of which further includes a destination address field 510, a destination port field 515, a source address field 520, a source port field 520, a MDN field 530, and an app ID field 535.

Destination address field 510 stores the network address of the third party app server(s) 125 (i.e., app-server-IP) that is the destination of an IP connection session established by mobile device 105. Destination port field 515 stores the port identifier, associated with the network address stored in field 510, of the third party app server(s) 125 (i.e., app-server-port) that is the destination of the IP connection session established by mobile device 105.

Source address field 520 stores the network address associated with the mobile device 105 originating the IP connection session. Source port field 525 stores the port identifier, associated with the network address stored in field 520, of the mobile device 105 originating the IP connection session. MDN field 530 stores a MDN assigned to the mobile device 105, originating the IP connection session, within the PLMN of network 150 that serves mobile device 105. App identifier (ID) field 535 stores a same unique application ID, as stored in field 410 of AS provisioning table 400, with the particular app ID stored in field 535 being the app ID (app-ID) associated with the particular third party application server(s) 125 that is the destination of the particular IP connection session represented by record 505, and with a particular third party mobile app 155 at a mobile device 105.

FIG. 6 depicts an exemplary implementation of ES provisioning table 600. ES provisioning table 600 may be stored in enforcement server DB 140. As shown, table 600 includes multiple records 610, each of which further includes an app ID field 620, an app server address field 630, and an app server port field 640.

App ID field 620 stores a unique application ID that is assigned to the particular third party app server(s) 125, whose network address and port is stored in app server address field 630 and app server port field 640, for a particular third party mobile app 155 at a mobile device 105. App server address field 630 stores the network address of third party app server(s) 125 that has been assigned the app ID stored in app ID field 620 of record 610. App server port field 640 stores the port identifier of third party app server(s) 125 that has been assigned the app ID stored in app ID field 620 of record 610.

FIG. 7 depicts an exemplary implementation of ES device session record table 700. ES device session record table 700 may be stored in enforcement server DB 140. As shown, table 700 includes multiple records 710, each of which further includes a source address field 720 and a source MDN field 730. Source address field 720 stores a network address of mobile device 105 that has originated the IP connection session associated with record 710. Source MDN field 730 stores a MDN assigned to the mobile device 105, originating the IP connection session associated with record 710, within the PLMN of network 150 that serves mobile device 105.

FIG. 8 depicts an exemplary implementation of app server DB 800. As shown, DB 800 includes multiple entries 810, each of which further includes an app ID field 820, and an app private key field 830. App ID field 820 stores a particular application ID, assigned by provisioning portal 120, to third party app server(s) 125 for a particular third party mobile app 155 at a mobile device 105. Each entry 810 of DB 800 may store a different application ID, for multiple different third party mobile apps 155 executing at multiple different mobile devices 105. App private key field 830 stores the private key of the public key (app-pubkey)/private key (app-privkey) pair that is assigned to app server owner 160 of third party app server(s) 125. The public/private key pair may be used for communication between a particular third party mobile app 155 at a particular mobile device 105 and third party app server(s) 125.

The number and content of the fields of the tabular data structures of tables 400, 500, 600, 700 and DB 800 illustrated in FIGS. 4-8 are for illustrative purposes. Other types of data structures may alternatively be used. The data structures of tables 400, 500, 600, 700 and DB 800 may have different structures than those shown in FIGS. 4-8, and may include fewer, more, and/or one or more different types of fields as compared to those depicted in FIGS. 4-8.

Figure 9A:
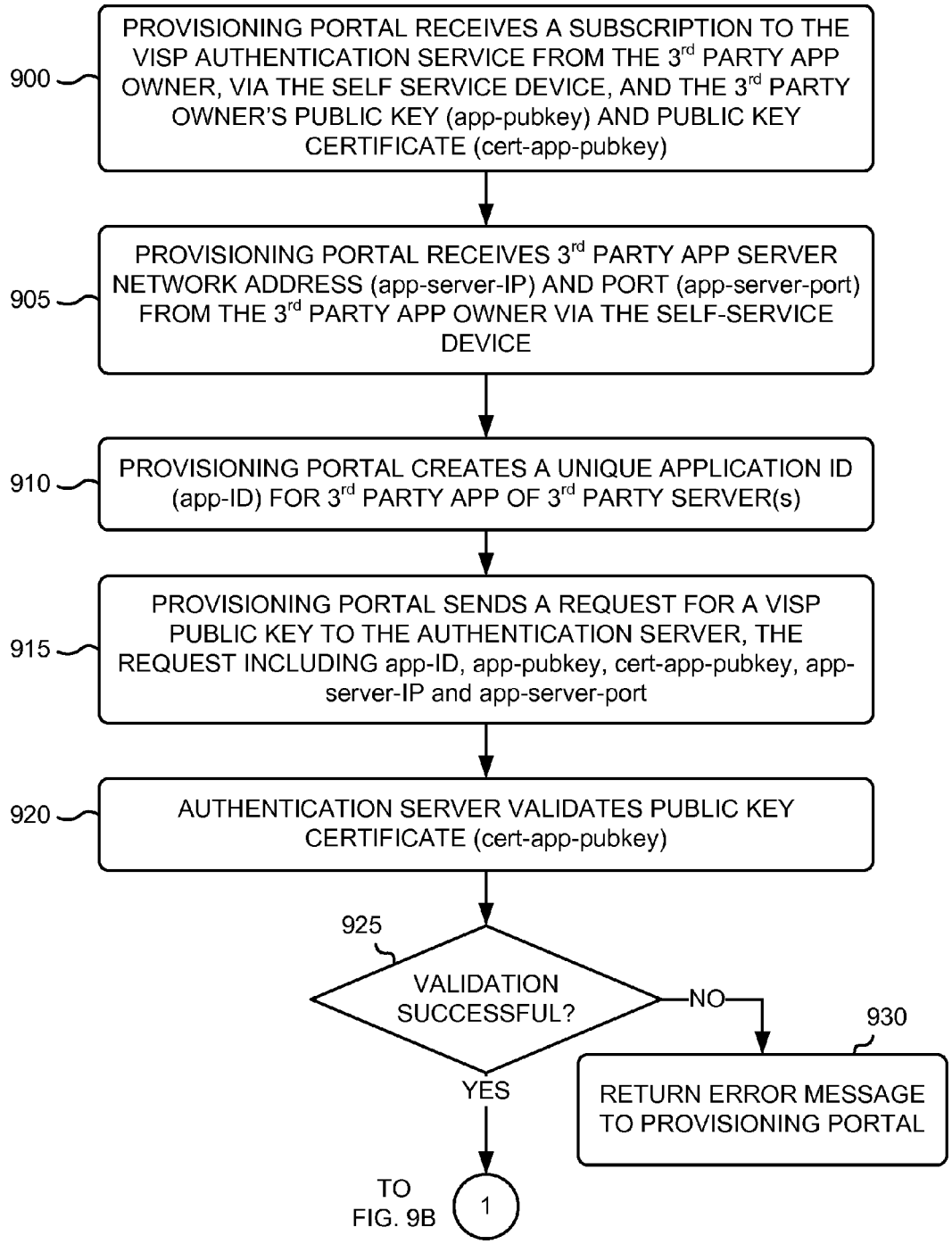
FIGS. 9A-9C are flow diagrams illustrating an exemplary process for subscribing to, and provisioning of, a VISP authentication service that authenticates sessions between third party mobile apps and third party application servers.
Figure 9B:
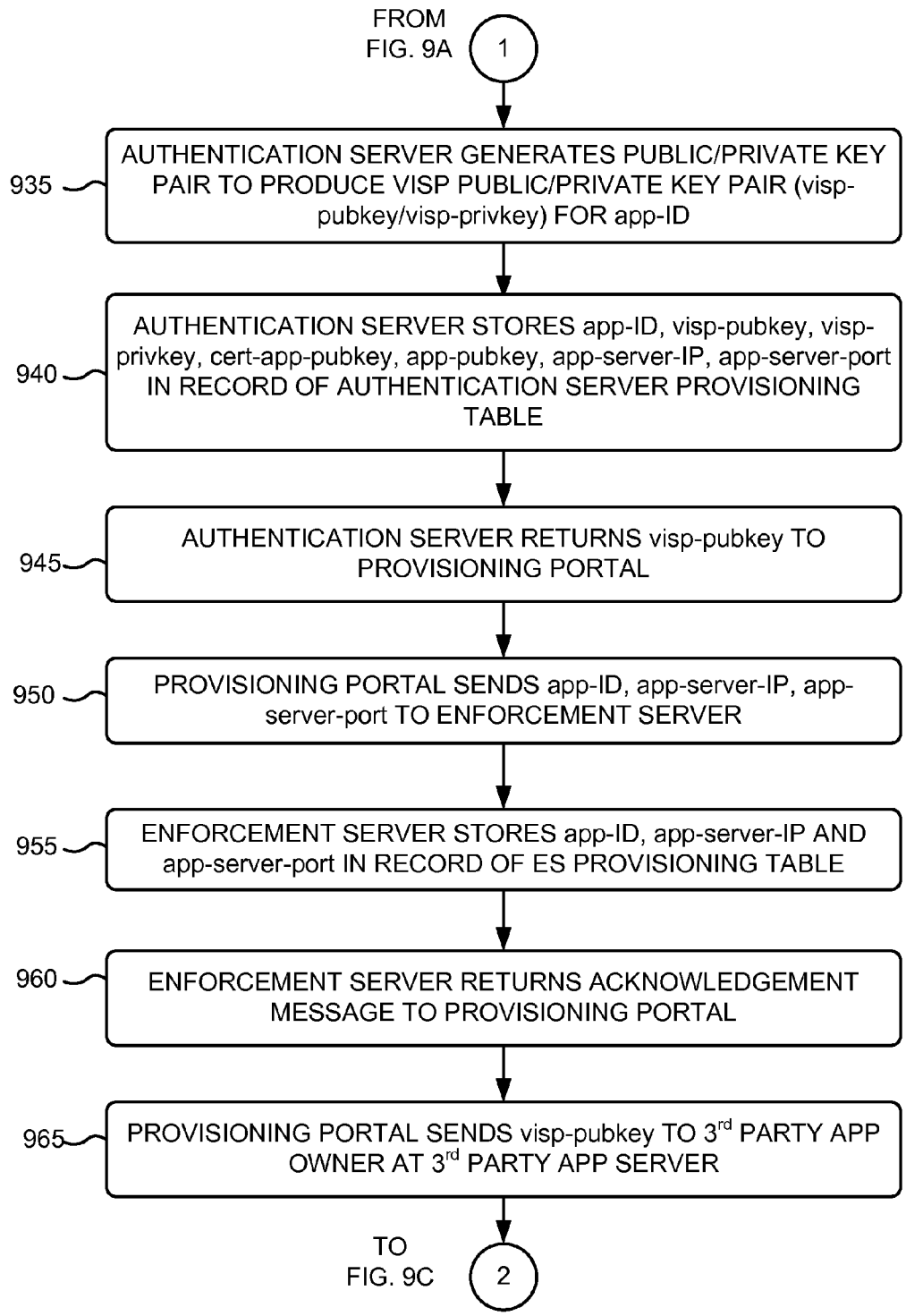
Figure 9C:
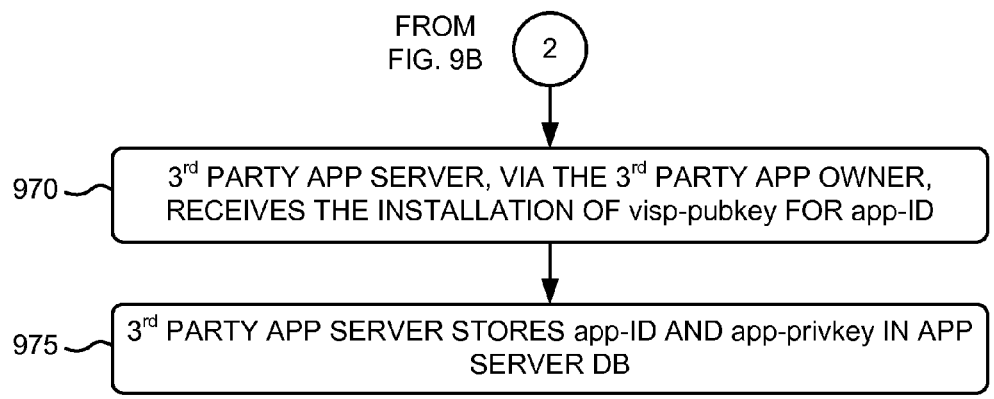

FIGS. 9A-9C are flow diagrams illustrating an exemplary process for subscribing to, and provisioning of, a VISP authentication service that authenticates sessions between third party mobile apps and third party application servers. The exemplary process of FIGS. 9A-9C may be implemented by devices of network environment 100, including self service device 135, authentication server(s) 115, enforcement server(s) 110, provisioning portal 120, and third party app server(s) 125. The exemplary process of FIGS. 9A-9C is described with reference to the messaging diagrams of FIGS. 10A and 10B.

Figure 10A:
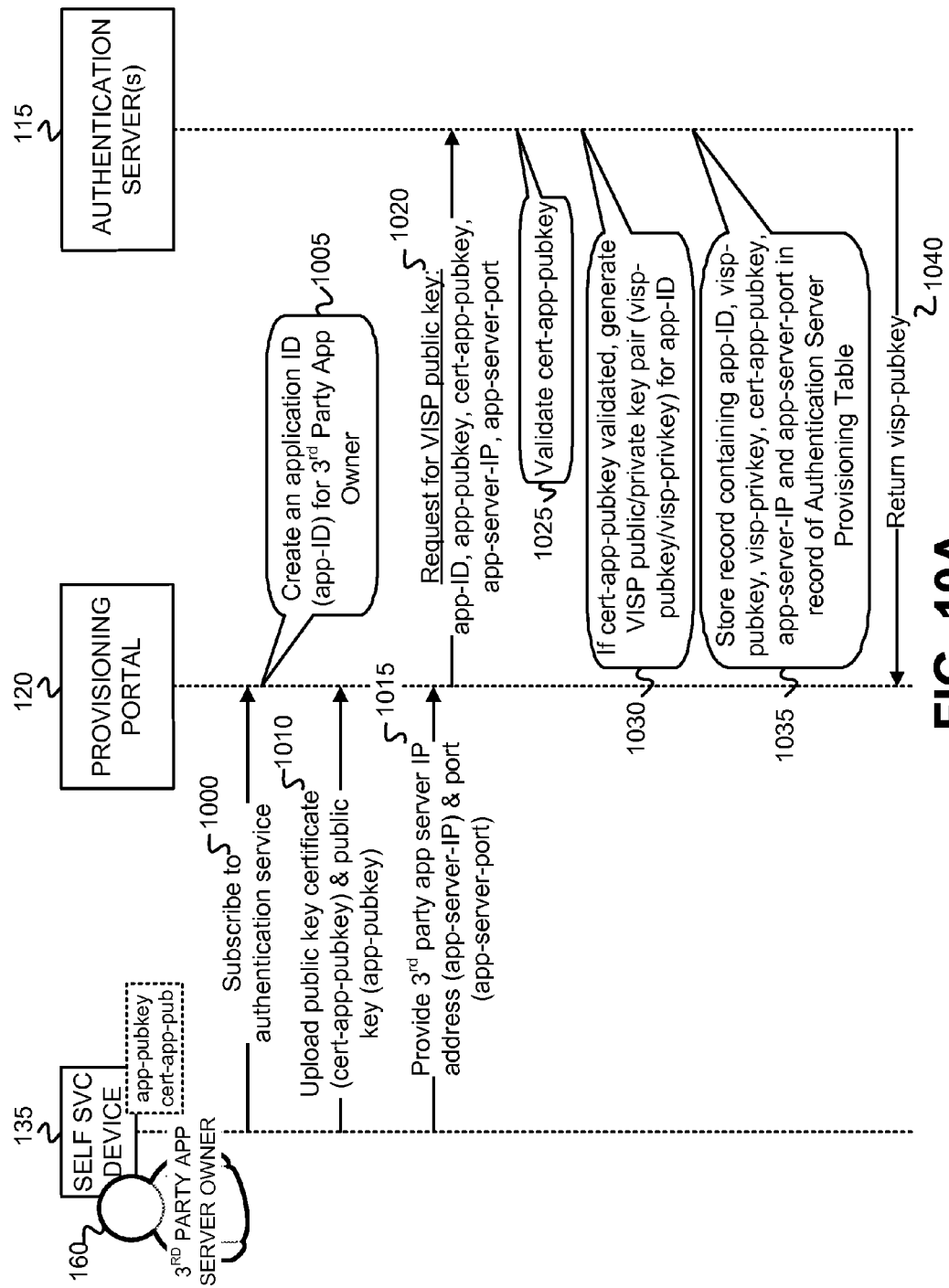
FIGS. 10A and 10B are messaging diagrams associated with the exemplary process of FIGS. 9A-9C.

The exemplary process includes provisioning portal 120 receiving a subscription to the VISP authentication service from third party app owner 160, via self-service device 135, and third party owner 160's public key (app-pubkey) and public key certificate (cert-app-pubkey) (block 900). App server owner 160 may set up an account, via self-service device 135 and provisioning portal 120, for subscribing to the VISP authentication service described herein. Setting up the account may include providing app server owner 160's public key (app-pubkey) of a public/private key pair, and a public key certificate (cert-app-pubkey) obtained, for example, from a PKI certificate authority. Provisioning portal 120 receives the network address (app-server-IP) and port (app-server-port) associated with the third party app server(s) 125 from third party app owner 160 via self-service device 135 (block 905). App server owner 160 retrieves the app-server-IP network address and app-server-port port identifier from app server 125, and provides the information to provisioning portal 120 via self-service device 135. FIG. 10A depicts app server owner 160, at self-service device 135, subscribing 1000 to the authentication service, uploading 1010 the public key (app-pubkey) and public key certificate (cert-app-pubkey) to provisioning portal 120, and providing 1015 the network address (app-server-IP) and port identifier (app-server-port) of the third party app server 125 to provisioning portal 120.

Upon receipt of the information via self service device 135, provisioning portal 120 creates a unique application identifier (app-ID) for the third party app of third party app server(s) 125 (block 910). FIG. 10A shows provisioning portal 120 creating 1005 an application ID (app-ID) for app server owner 160 and the corresponding third party app server 125.

Provisioning portal 120 sends a request for a VISP public key to authentication server(s) 115, the request including the app ID (app-ID), the third party owner 160's public key (app-pubkey), the network address of third party app server(s) 125 (app-server-IP), and the port of third party app server(s) 125 (app-server-port) (block 915). FIG. 10A depicts provisioning portal 120 sending a message 1020 that includes a request for a VISP public key that further includes app-ID, app-pubkey, cert-app-pubkey, app-server-IP, app-server-port. Authentication server(s) 115 validates the received public key certificate cert-app-pubkey (block 920). FIG. 10A depicts authentication server(s) 115 engaging in validation 1025 of the public key certificate cert-app-pubkey. Authentication server(s) 115 may validate the received public key certificate by sending the certificate to the certificate authority (CA) of a PKI system, which validates the certificate, using existing certificate validation techniques, and returns a "validation success" or "validation fail" message to authentication server(s) 115 based on the results of the validation. If validation of the public key certificate is not successful (NO—block 925), then authentication server(s) 115 returns an error message to provisioning portal 120 (block 930), and the exemplary process completes. If validation of the public key certificate is successful (YES—block 925), then authentication server(s) 115 generates a public/private key pair to produce key pair visp-pubkey/visp-privkey for the app-ID, where visp-pubkey is the public key for use in encrypting data during certain aspects of VISP authentication and visp-privkey is the private key for use in decrypting data during certain aspects of VISP authentication (block 935). FIG. 10A depicts authentication server(s) 115 generating 1030 the VISP public/private key pair for the app-ID.

Authentication server(s) 115 stores the app-ID, visp-pubkey, visp-privkey, cert-app-pubkey, app-pubkey, app-server-IP, app-server-port in a record of authentication server provisioning table 400 of authentication server DB 145 (block 940). FIG. 10A depicts authentication server(s) 115 storing 1035 the app-ID, visp-pubkey, visp-privkey, cert-app-pubkey, app-pubkey, app-server-IP, app-server-port in a particular record of authentication server provisioning table 400. For example, authentication server(s) 115 stores app-ID in app ID field 410, visp-pubkey in VISP public key field 435, visp-privkey in VISP PVT key field 440, cert-app-pubkey in app owner public key cert field 430, app-pubkey in app owner public key field 425, app-server-IP in app server address field 415, and app-server-port in app server port field 420 of a record 405 of table 400. Authentication server(s) 115 returns the VISP public key visp-pubkey to provisioning portal 120 (block 945). FIG. 10A shows authentication server(s) sending a message 1040 to provisioning portal 120 that includes the VISP public key visp-pubkey.

Figure 10B:
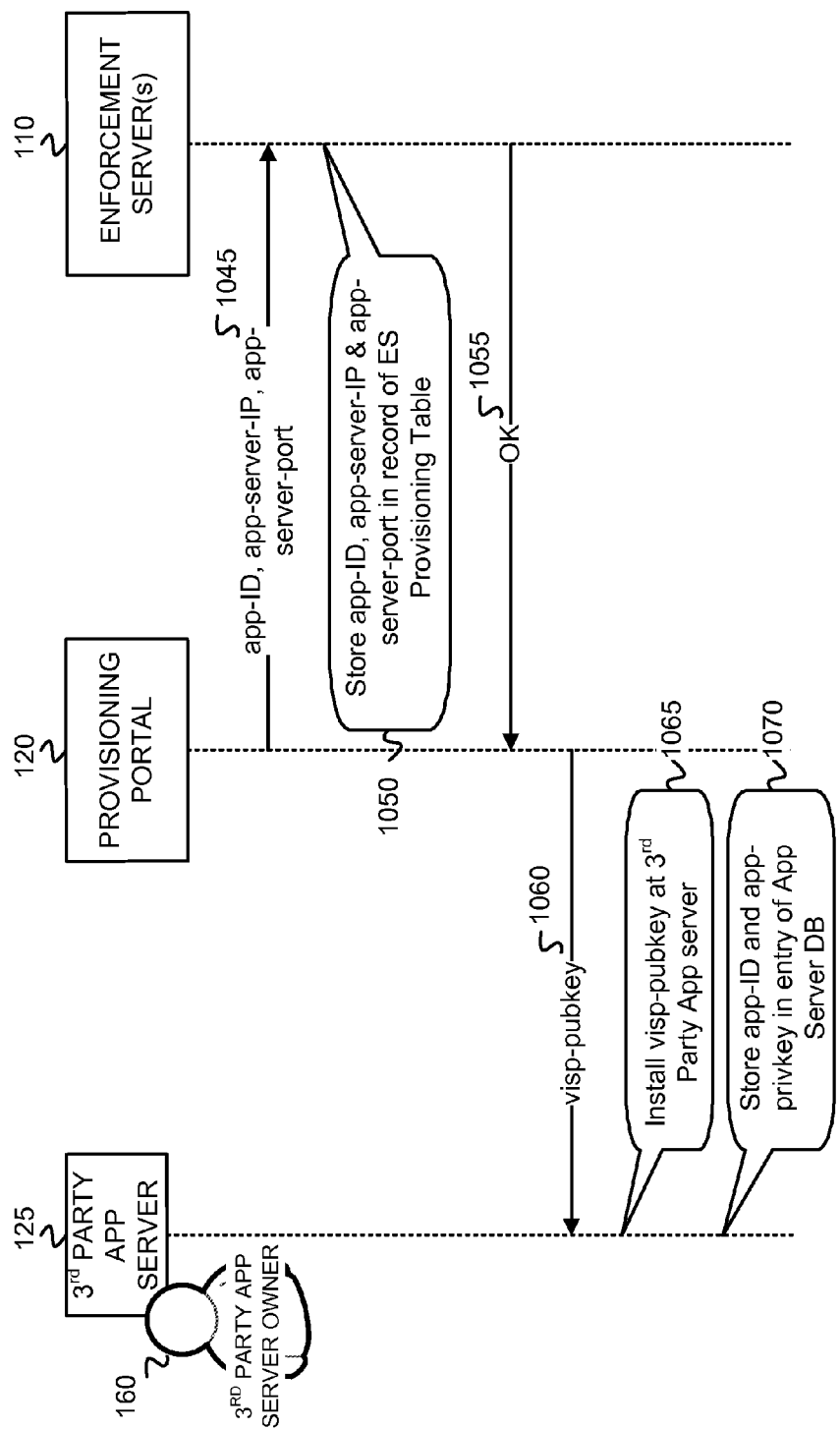

Provisioning portal 120 sends the app-ID, app-server-IP, and app-server-port to enforcement server(s) 110 (block 950). FIG. 10B depicts provisioning portal 120 sending a message 1045 that includes the app-ID, the app-server-IP and the app-server-port to enforcement server(s) 110. Enforcement server(s) 110 stores app-ID, app-server-IP and app-server-port in a record of enforcement server provisioning table 600 of enforcement server DB 140 (block 955), and as shown in FIG. 10B (1050). For example, enforcement server(s) 110 stores app-ID in app ID field 620, app-server-IP in app server address field 630 and app-server-port in app server port field 640 of a record 610 of table 600. Enforcement server(s) 110 returns an acknowledgement message to provisioning portal 120 (block 960). FIG. 10B depicts enforcement server(s) 110 returning an "OK" acknowledgement message 1055 to provisioning portal 120 to acknowledge receipt of the data in message 1045.

Provisioning portal 120 sends visp-pubkey to third party app owner 160 at third party server(s) 125 (block 965), and third party app server(s) 125, via the third party app owner 160, receives the installation of visp-pubkey for the app-ID (block 970). FIG. 10B depicts provisioning portal 120 sending a message 1060 to third party app server 125 that includes the VISP public key (visp-pubkey). Upon receipt of message 1060, as shown in FIG. 10B, third party app server 125, via interaction by app server owner 160, installs 1065 the VISP public key for subsequent use in encrypting data. Third party app server(s) 125 stores 1070 the app-ID and app-privkey in app server DB 130 (block 975). For example, third party app server(s) 125 stores app-ID in app ID field 820, and app-privkey in app private key field 830, of an entry 810 of app server DB 800.

The exemplary process of FIGS. 9A-9C may be executed each time an app server owner 160, who owns and/or operates a third party app server 125, provides supporting data (e.g., public key certificate, server network address and port, public key) for subscribing to the VISP authentication service described herein. Execution of the process of FIGS. 9A-9C completes the subscription and provisioning process for VISP authentication of communications between a third party mobile app 155 at mobile device 105 and third party app server 125.

Figure 11A:
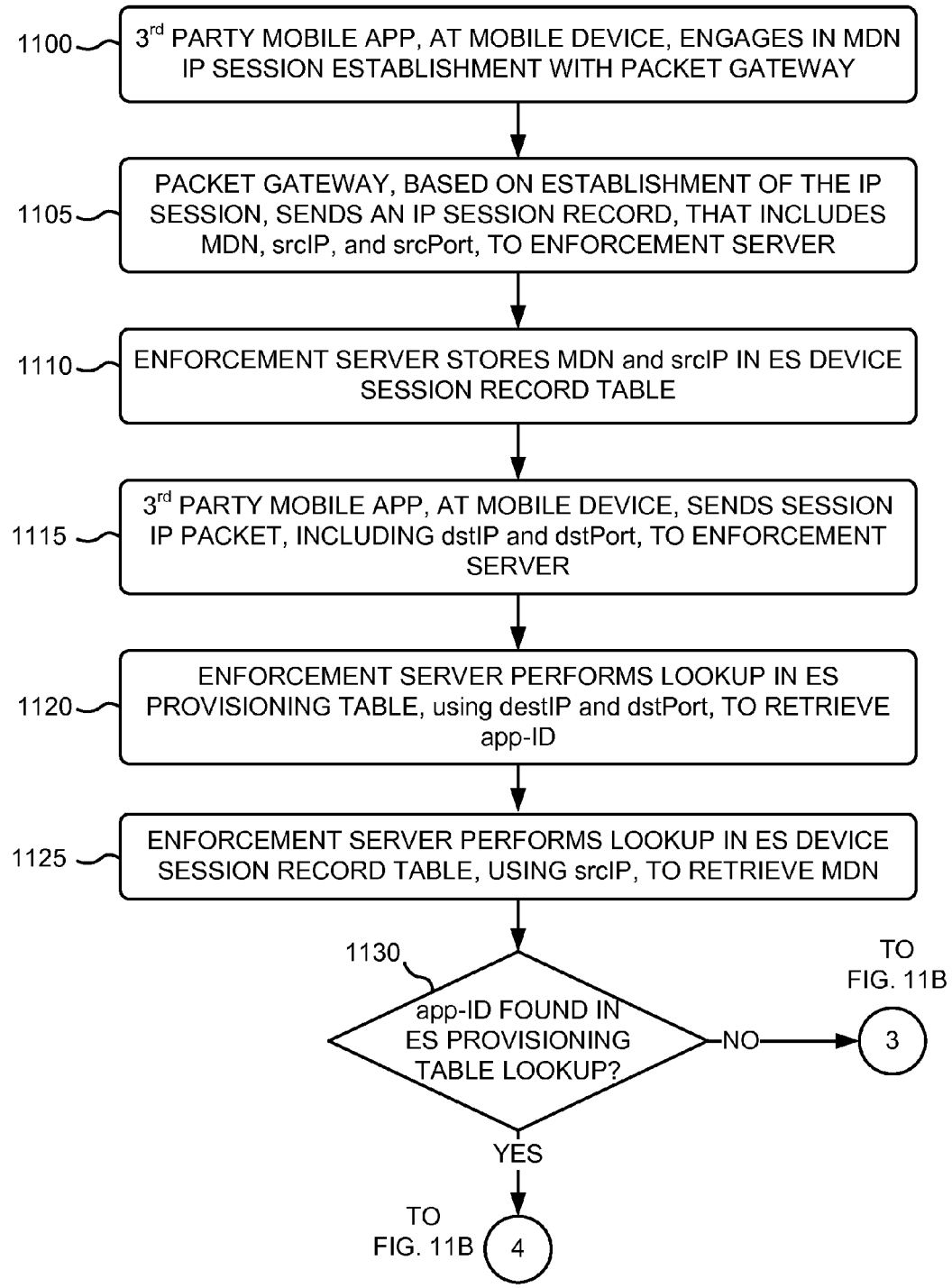
FIGS. 11A and 11B are flow diagrams illustrating an exemplary process for device session data collection for VISP authentication.
Figure 11B:
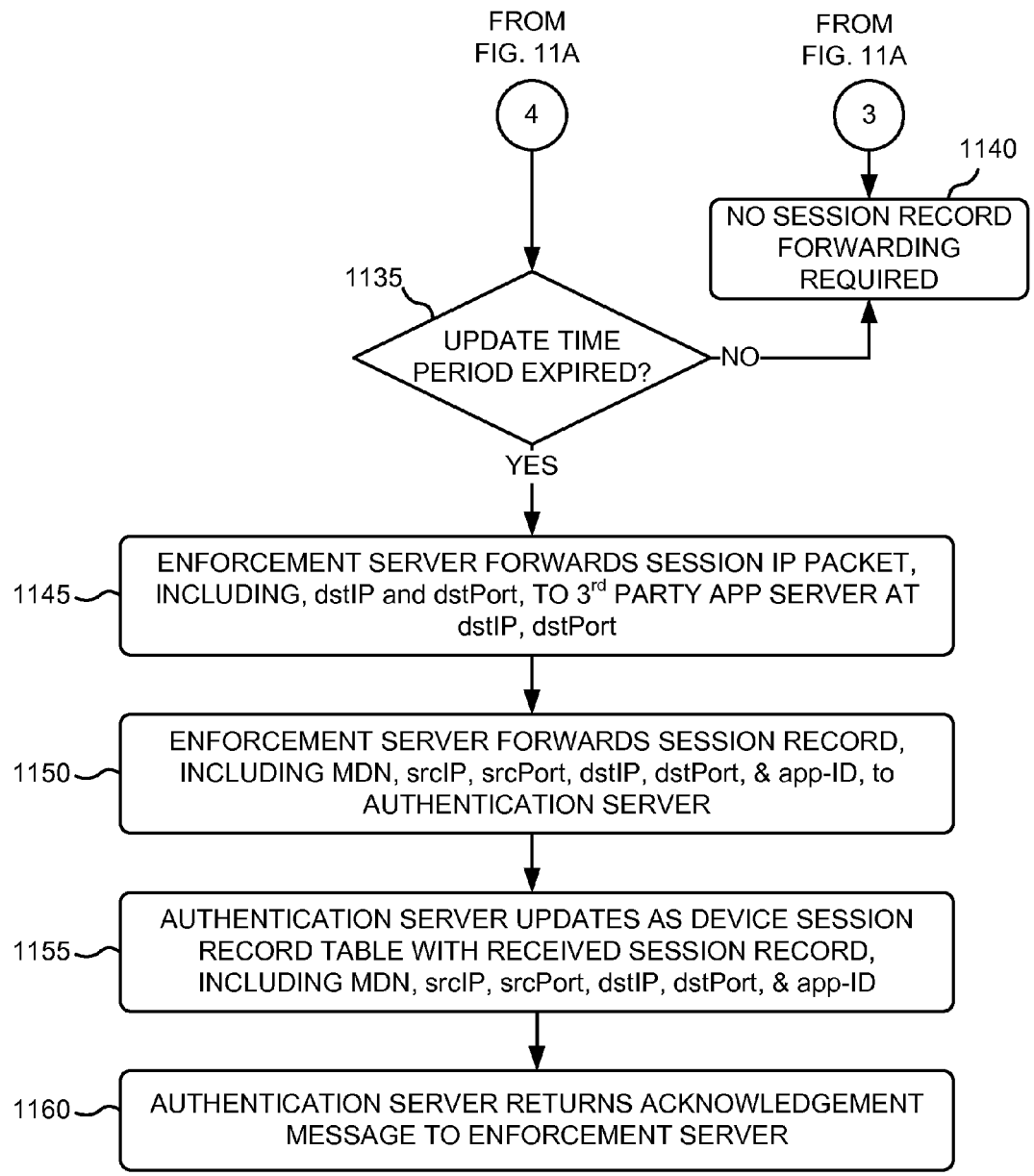

FIGS. 11A and 11B are flow diagrams illustrating an exemplary process for device session data collection for VISP authentication. The exemplary process of FIGS. 11A and 11B may be implemented by devices of network environment 100, including mobile device 105, packet gateway 250, enforcement server(s) 110, authentication server(s) 115, and third party app server(s) 125. The exemplary process of FIGS. 11A and 11B is described with reference to the messaging diagram of FIG. 12.

Figure 12:
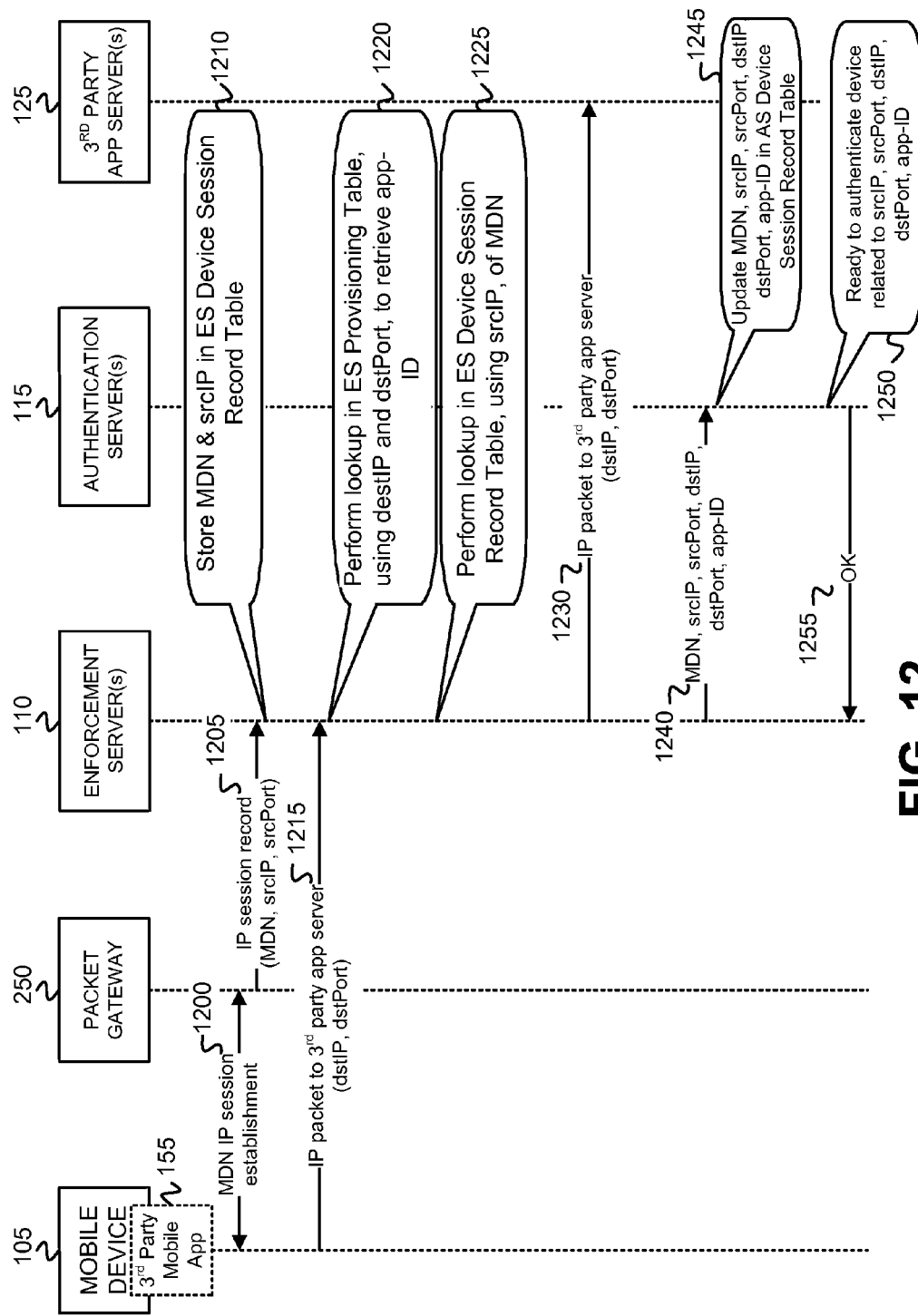
FIG. 12 is a messaging diagram associated with the exemplary process of FIGS. 11A and 11B.

Third party mobile app 155, at mobile device 105, engages in MDN IP session establishment with packet gateway 250 (block 1100). Mobile device 105 first performs a "device network attach" in accordance with the PLMN network protocols (e.g., 4G LTE), and then mobile app 155 engages in IP session establishment with packet gateway 250. FIG. 12 depicts mobile device 105 engaging in MDN IP session establishment 1200 with packet gateway 250. Packet gateway 250, based on establishment of the IP session, sends an IP session record, which includes MDN, srcIP, and srcPort, to enforcement server(s) 110 (block 1105). The MDN is the mobile directory number of mobile device 105 in the PLMN, srIP is the IP network address of mobile device 105 for this IP session, and srcPort is the Port identifier of mobile device 105 for this IP session. FIG. 12 shows packet gateway 250 forwarding an IP session record 1205, that includes the MDN, srcIP and srcPort, to enforcement server(s) 110.

Upon receipt of the IP session record from packet gateway 250, enforcement server(s) 110 stores the MDN and srcIP in enforcement server device session record table 700 (1110). FIG. 12 depicts enforcement server(s) 110 storing 1210 the MDN and srcIP in ES device session record table 700. For example, referring to FIG. 7, enforcement server(s) 110 stores the received srcIP address in source address field 720, and the received MDN in source MDN field 730 of a record 710 of table 700.

Third party mobile app 155, at mobile device 105, sends a session IP packet, including dstIP and dstPort, to enforcement server(s) 110 (block 1115). The dstIP and dstPort include the IP address and Port identifier of the destination third party app server 125 with which app 155 at mobile device 105 is attempting to engage in a session. FIG. 12 depicts mobile device 105 sending an IP packet 1215 to dstIP, dstPort of third party app server(s) 125, but the IP packet 1215 is first intercepted by enforcement server(s) 110. Enforcement server(s) 110 performs a lookup in enforcement server provisioning table 600, using destIP and dstPort, to retrieve the app-ID (block 1120). For example, enforcement server(s) 110 indexes ES provisioning table 600 to locate a record 610 having values in app server address field 630 and app server port field 640 that match destIP and dstPort, respectively. Enforcement server(s) 110 retrieves the app ID from app ID field 620 of the located record 610 in table 600. FIG. 12 depicts enforcement server(s) 110 performing 1220 a lookup in the ES provisioning table 600, using destIP and dstPort, to retrieve the app ID.

Enforcement server(s) 110 performs a lookup in enforcement server device session record table 700, using srcIP, to retrieve the MDN (block 1125). For example, enforcement server(s) 110 indexes ES device session record table 700 to locate a record 710 having a value in source address field 720 that matches srcIP. Enforcement server(s) 110 retrieves the MDN from source MDN field 730 of the located record 710 in table 700. FIG. 12 depicts enforcement server(s) 110 performing 1225 a lookup in the ES device session record table, using srcIP to retrieve the MDN.

Enforcement server(s) 110 determines if the app-ID was found in the enforcement server provisioning table lookup (block 1130). If the app-ID was not found (NO—block 1130), then the exemplary process continues at block 1140. If the app-ID was found (YES—block 1130), then enforcement server(s) 110 determines if the update time period has expired (block 1135). The update period may include a configurable time period. If the update period has not expired (NO—block 1135), or if the app-ID was not found (at block 1130), then no session record forwarding is required (block 1140), and the exemplary process completes.

If the update period has expired (YES—block 1135), then enforcement server(s) 110 forwards the session IP packet, including dstIP and dstPort, to third party app server(s) 125 at dstIP, dstPort (block 1145). FIG. 12 depicts enforcement server(s) 110 sending the IP packet 1230 to third party app server(s) 125 at the network address and port corresponding to dstIP and dstPort. Enforcement server(s) 110 forwards a session record, which includes MDN, srcIP, srcPort, dstIP, dstPort, and app-ID, to authentication server(s) 115 (block 1150). FIG. 12 depicts enforcement server(s) 110 sending a session record 1240, including the MDN, srcIP, srcPort, dstIP, dstPort, and app-ID, to authentication server(s) 115. Authentication server(s) 115 updates the authentication server device session record table 500 with the received session record, including MDN, srcIP, srcPort, dstIP, dstPort, and app-ID (block 1155). Upon receipt of the session record from enforcement server(s) 110, authentication server 115 indexes AS device session record table 500 with the app-ID from the session record to locate the record 505 having a value in app ID field 535 that matches the app-ID. Authentication server 115 stores dstIP, dstPort, srcIP, srcPort, and MDN in destination address field 510, destination port 515, source address field 520, source port field 525, and MDN field 530, respectively. FIG. 12 depicts authentication server(s) 115 updating 1245 MDN, srcIP, srcPort, dstIP, dstPort, app-ID in the AS device session record table 500. Upon updating 1245 the record in the AS device session record table 500, authentication server(s) 115 is ready 1250, as shown in FIG. 12, to authenticate the mobile device 105 related to the record received from enforcement server(s) 110. Authentication server(s) 115 returns an acknowledgment message to enforcement server(s) 110 (block 1160). The acknowledgement message notifies enforcement server(s) 110 that the record was received, and the AS device session record table 500 was updated. FIG. 12 depicts authentication server(s) 115 returning an OK acknowledgement message 1255 to enforcement server(s) 110.

Figure 13A:
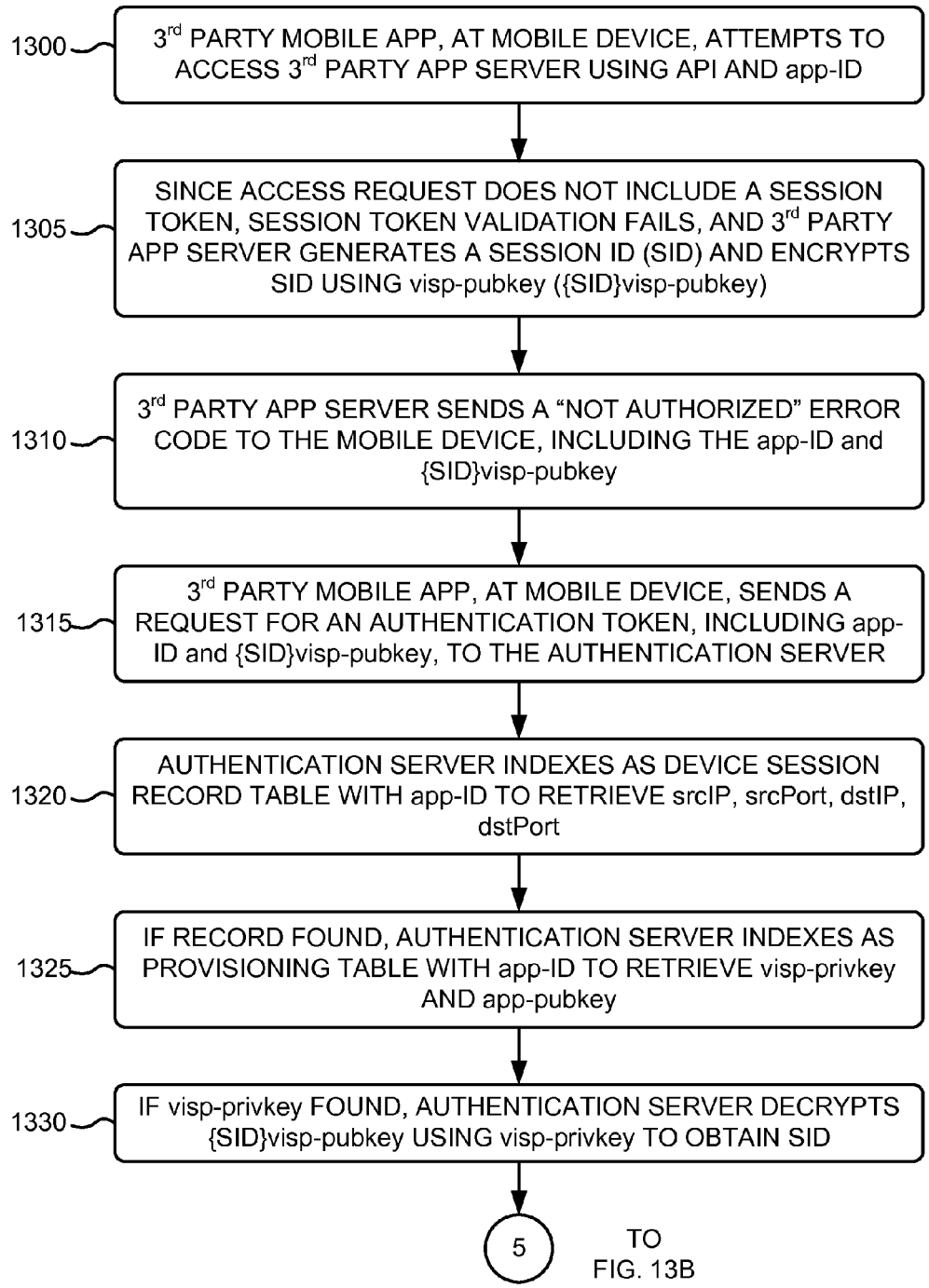
FIGS. 13A-13C are flow diagrams illustrating an exemplary process for authenticating a communication session between a third party mobile application at a mobile device and a third party application server.
Figure 13B:
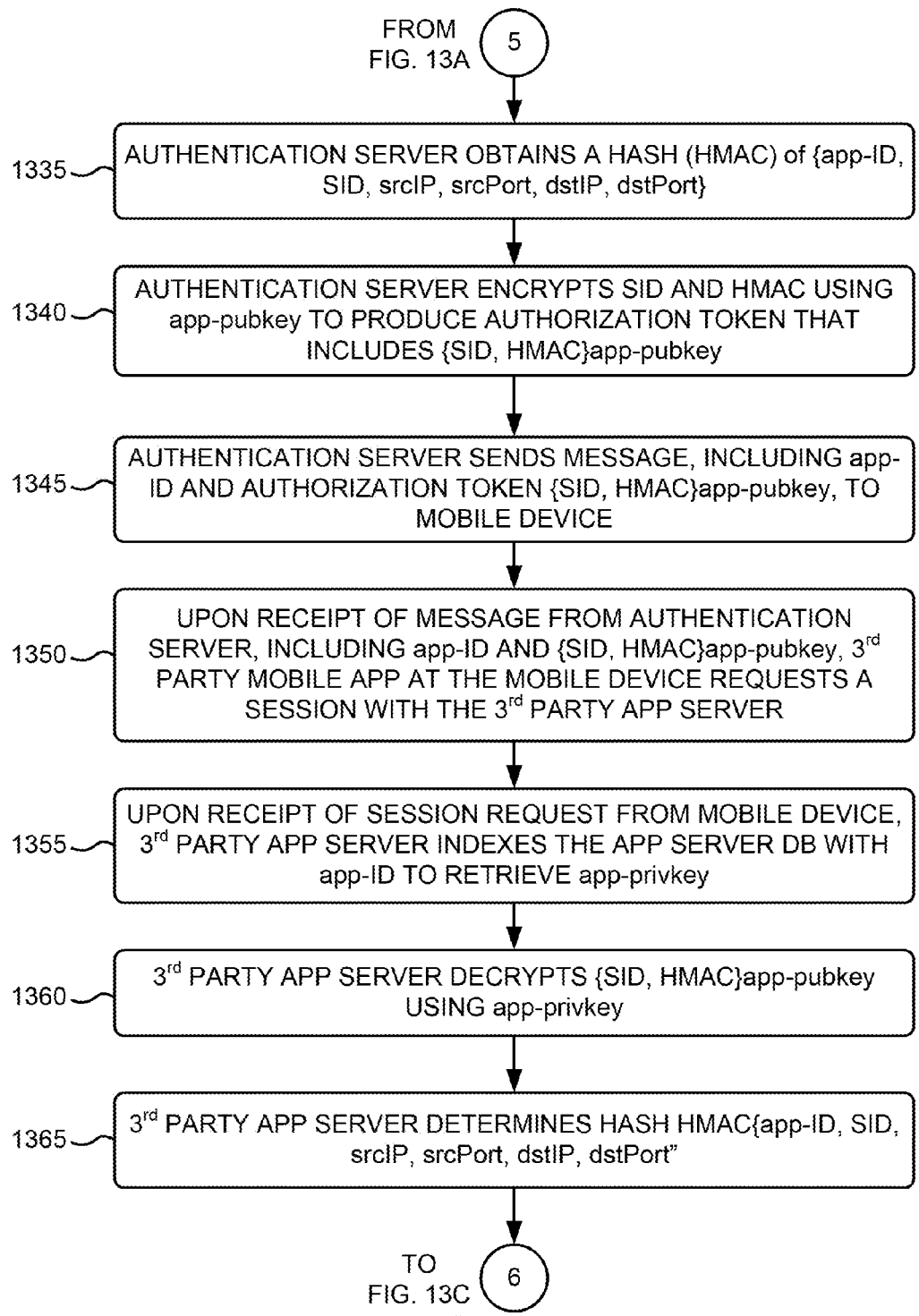
Figure 13C:
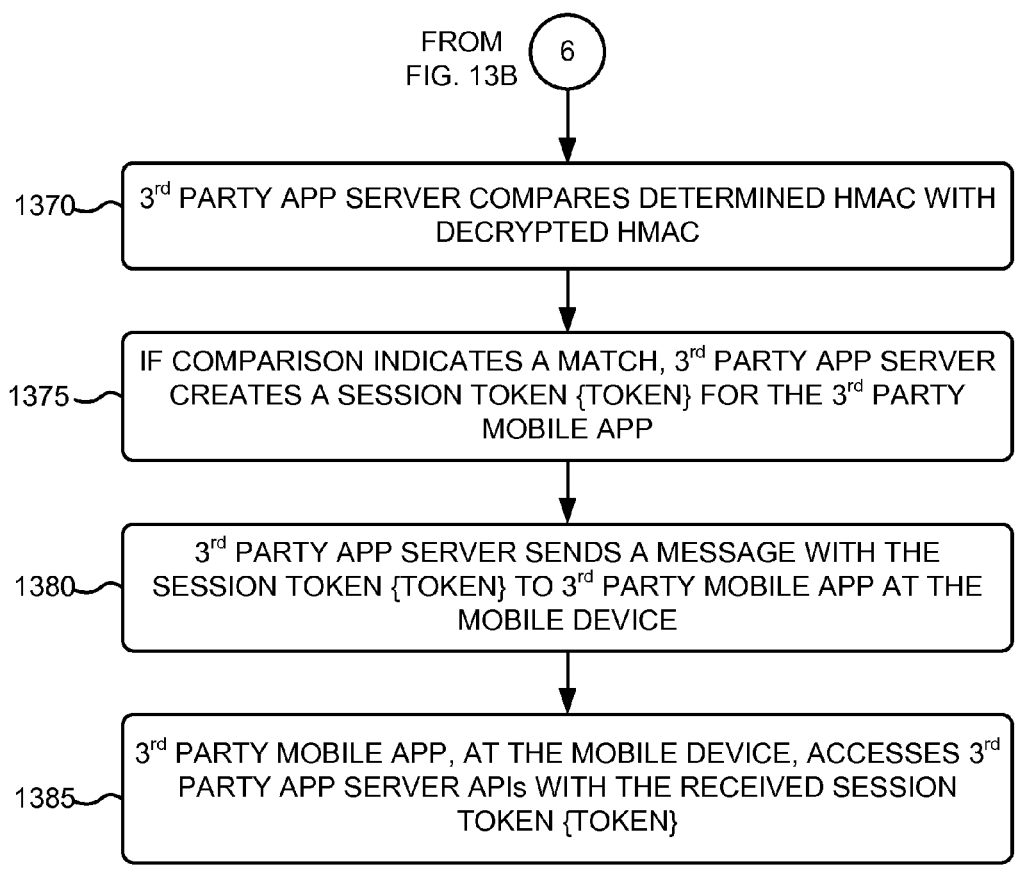

FIGS. 13A-13C are flow diagrams illustrating an exemplary process for authenticating a communication session between third party mobile application 155 at mobile device 105 and third party app server(s) 125. The exemplary process of FIGS. 13A-13C may be implemented by devices of network environment 100, including mobile device 105, third party app server(s) 125, and authentication server(s) 115. The exemplary process of FIGS. 13A-13C is described with reference to the messaging diagrams of FIGS. 14A and 14B.

Figure 14A:
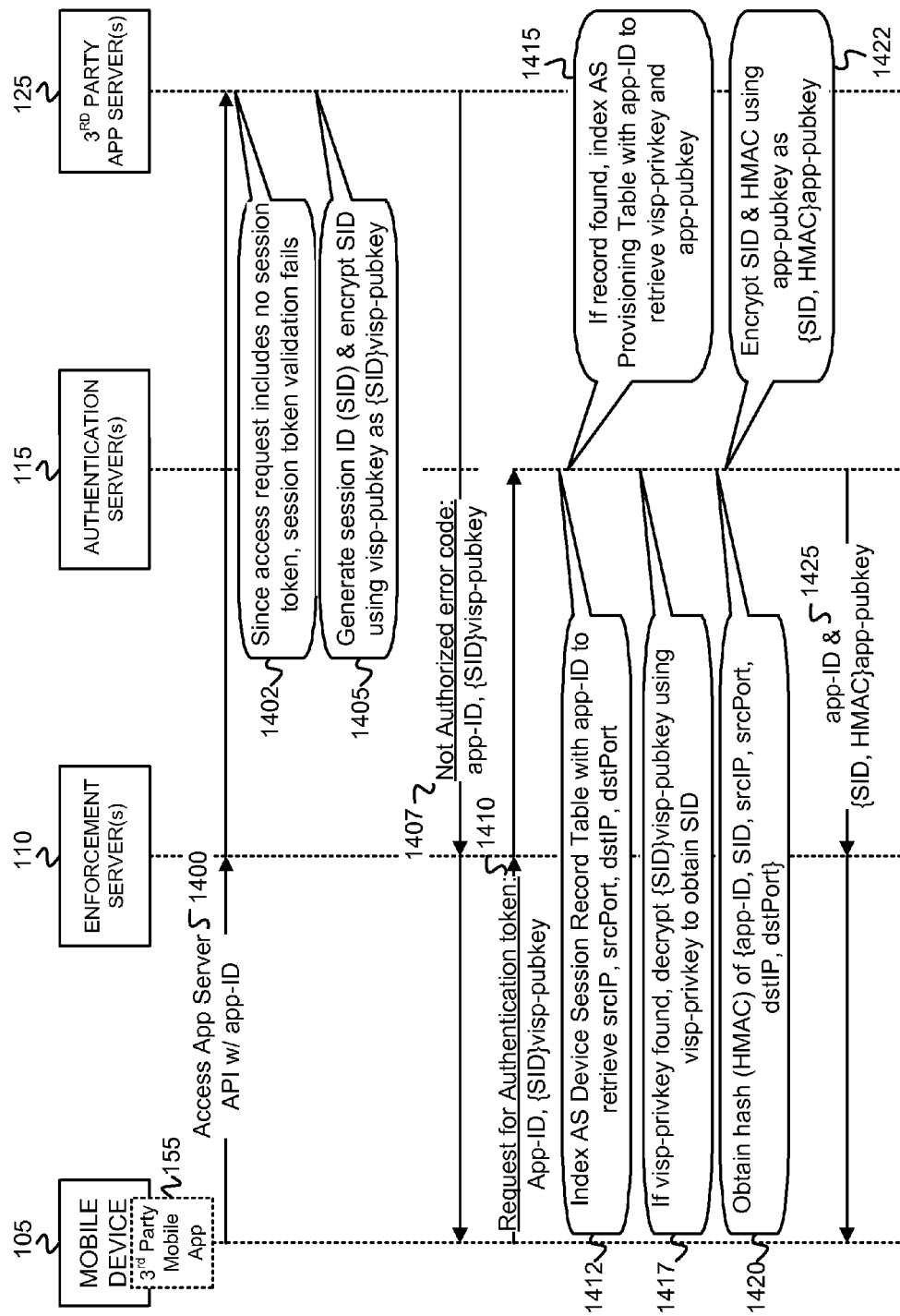
FIGS. 14A and 14B are messaging diagrams associated with the exemplary process of FIGS. 13A-13C.

The exemplary process includes third party mobile app 155, executing at mobile device 105, attempting to access the third party app server(s) 125, using an Application Programming Interface (API) and the app-ID (block 1300). The app-ID includes the application identifier assigned to third party app server 125 (i.e., at block 910 of FIG. 9A). FIG. 14A depicts third party mobile app 155 at mobile device 105 attempting to access 1400 third party app server(s) 125 via enforcement server(s) 110. As shown in FIG. 14A, third party mobile app 155 sends the access request to enforcement server(s) 110 which, in turn, forwards the access request to third party app server(s) 125.

Since the access request from third party mobile app 155 does not include a session token, session token validation fails, and third party app server(s) 125 generates a session ID (SID) and encrypts the SID using visp-pubkey ({SID}visp-pubkey) (block 1305). Any type of algorithm may be used for generating a unique session identifier. In one implementation, third party app server(s) 125 may generate sequential SIDs, where each new session includes the previous SID incremented by one (e.g., SID=SID+1). The SID generated by server(s) 125 may include a specified length of data (e.g., 16 bits, 4 bytes, 16 bytes, etc.). The public encryption key visp-pubkey may be the public key generated by authentication server(s) 115 in block 935 of FIG. 9B. Third party app server(s) 125 may use any type of asymmetric encryption algorithm for encrypting the SID using visp-pubkey, as long as the encryption algorithm is in agreement with the algorithm used by authentication server(s) 115 used to generate the original public/private key pair (e.g., visp-pubkey/visp-privkey). FIG. 14A depicts, subsequent to the access attempt 1400, failure of the session token validation 1402, and third party app server(s) 125 generating 1405 the SID and encrypting the SID using visp-pubkey ({SID}visp-pubkey). Third party app server(s) 125 sends a "not authorized" error code to mobile device 105, including the app-ID and {SID}visp-pubkey (block 1310). FIG. 14A depicts third party app server(s) 125 returning a message 1407 containing a "not authorized" error code and also including the app-ID, and the encrypted SID ({SID}visp-pubkey)

Third party mobile app 155, executing at mobile device 105, sends a request for an authentication token, including app-ID and {SID}visp-pubkey, to authentication server(s) 115 (block 1315). FIG. 14A depicts third party mobile app 155 at mobile device 105 sending a request message 1410 that includes the app-ID and the encrypted SID. As further shown in FIG. 14A, third party mobile app 155 sends the request message 1410 to enforcement server(s) 110 which, in turn, forwards the message to authentication server(s) 115. Authentication server(s) 115 indexes authentication server device session record table 500 with the app-ID to retrieve srcIP, srcPort, dstIP, and dstPort (block 1320). Authentication server(s) 115 uses the app-ID received from mobile device 105 to locate a record 505 in AS device session record table 500 having a value in app ID field 535 that matches the app-ID. If a matching value is found in app ID field 535, authentication server(s) 115 retrieves the dstIP, dstPort, srcIP, and srcPort from dst address field 510, dst port field 515, source address 520, and source port field 525, respectively, of table 500. FIG. 14A depicts authentication server(s) 115 indexing 1412 the AS device session record table with the app-ID to retrieve the srcIP, srcPort, dstIP, and dstPort.

If a record is found, authentication server(s) 115 indexes authentication server provisioning table 400 with the app-ID to retrieve visp-privkey and app-pubkey (block 1325). Authentication server(s) 115 uses the app-ID received from mobile device 105 to locate a record 405 in AS provisioning table 400 having a value in app ID field 410 that matches the app-ID. If a matching value is found in app ID field 410, authentication server(s) 115 retrieves the visp-privkey, stored in VISP pvt key field 440, and app-pubkey, stored in app owner public key 425, of table 400. FIG. 14A depicts authentication server(s) 115 indexing 1415 the AS device session record table with the app-ID to retrieve the visp-privkey and app-pubkey.

If visp-privkey is found in table 400, authentication server(s) 115 decrypts {SID}visp-pubkey using visp-privkey to obtain the session identifier SID (block 1330). Authentication server(s) 115 uses any type of asymmetric decryption algorithm, corresponding to the encryption algorithm used to encrypt SID, for decrypting the SID using the private key visp-privkey. FIG. 14A depicts authentication server(s) 115 decrypting 1417 {SID}visp-pubkey using visp-privkey to obtain the SID.

Authentication server(s) 115 obtains a hash (HMAC) of {app-ID, SID, srcIP, srcPort, dstIP, dstPort} (FIG. 13B, block 1335) and encrypts SID and the obtained HMAC using app-pubkey to produce {SID, HMAC}app-pubkey (block 1340). Authentication server(s) 115 may use any type of algorithm that generates a hash of a block of data, including a block of data that further includes app-ID, SID, srcIP, srcPort, dstIP and dstPort. Third party mobile app 155 at mobile device 105 may use an identical hash algorithm, as used by authentication server(s) 115, for computing a hash in block 1365 below. FIG. 14A depicts authentication server(s) 115 obtaining 1420 a hash (HMAC) of the block of data that includes {app-ID, SID, srcIP, srcPort, dstIP, dstPort}. Authentication server(s) 115 encrypts SID and the obtained HMAC using app-pubkey to produce {SID, HMAC}app-pubkey (block 1340). Authentication server(s) 115 uses any type of asymmetric encryption algorithm for encrypting the SID and HMAC, where a corresponding algorithm for decrypting the SID and the HMAC is used by third party app server(s) 125 in block 1360 below. FIG. 14A depicts authentication server(s) 115 obtaining 1420 the hash of {app-ID, SID, srcIP, srcPort, dstIP, dstPort}, and encrypting 1422 the SID and hash (HMAC) using app-pubkey. Authentication server(s) 115 sends a message, that includes the app-ID and {SID, HMAC}app-pubkey to mobile device 105 (block 1345). FIG. 14A depicts authentication server(s) 115 sending a message 1425 that includes the app-ID and encrypted SID and HMAC ({SID, HMAC}app-pubkey) to mobile device 105. As shown in FIG. 14A, the message 1425 from authentication server(s) 115 is received at enforcement server(s) 110, and enforcement server(s) 110 forwards message 1425 to third party mobile app 155 at mobile device 105.

Figure 14B:
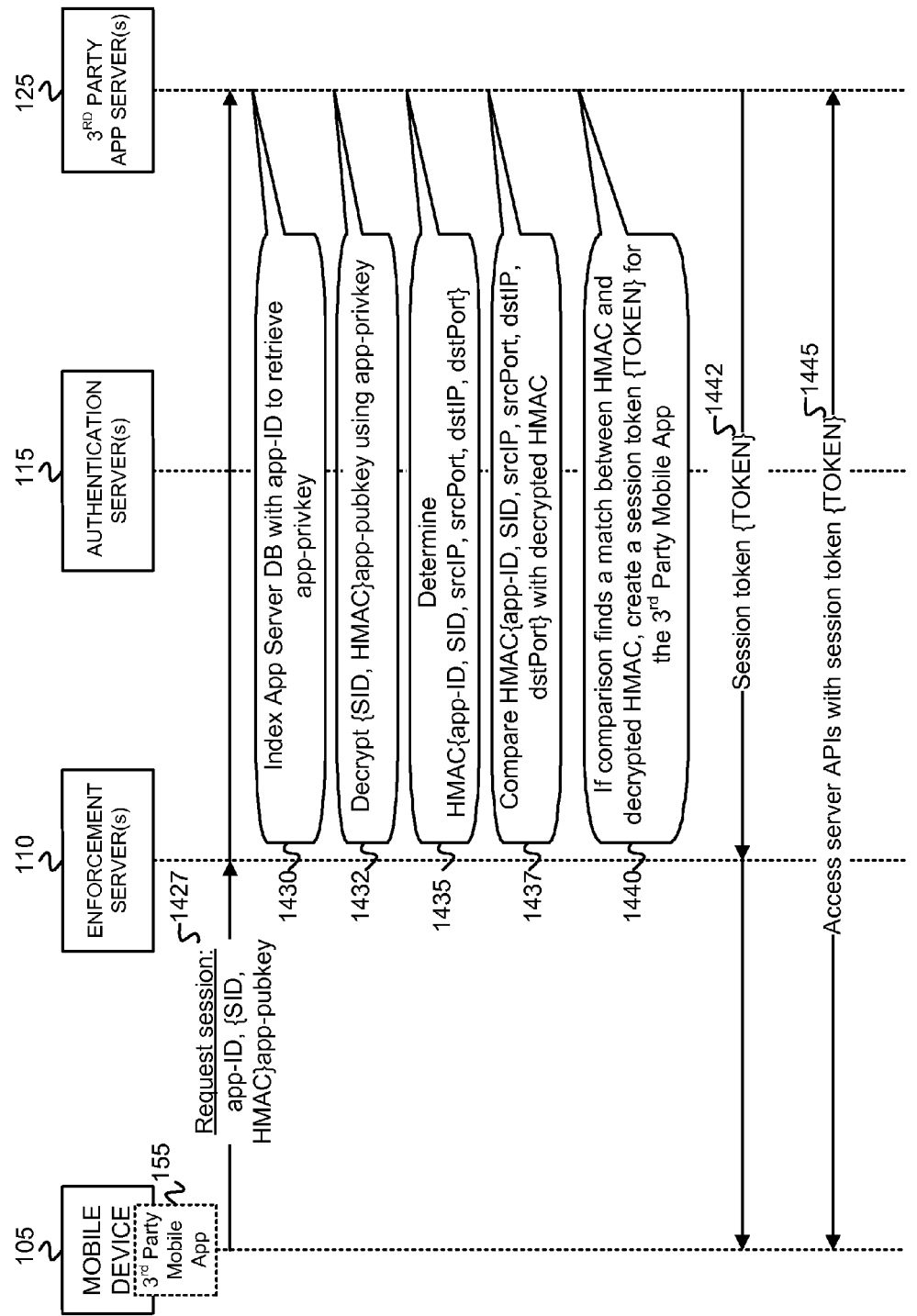

Upon receipt of the message from authentication server(s) 115, third party mobile app 155, executing at mobile device 110, requests a session with the third party app server(s) 125 (block 1350). FIG. 14B depicts third party mobile app 155 at mobile device 105 sending a request session message 1427, including the app-ID and encrypted SID and HMAC, to enforcement server(s) 110. Upon receipt of the session request from mobile device 110, third party app server(s) 125 indexes app server DB 800 with the app-ID to retrieve app-privkey (block 1355). Third party app server(s) 125 locates an entry 810 in app server DB 800 having a value in app ID field 820 that matches the app-ID. Third party app server(s) 125 retrieves the private key (app-privkey) stored in app private key field 830 of the located entry 810.

Third party app server(s) 125 decrypts {SID, HMAC}app-pubkey using app-privkey (block 1360), and determines a hash HMAC {app-ID, SID, srcIP, srcPort, dstIP, dstPort (block 1365). Third party app server(s) 125 decrypts the block of data that includes SID and HMAC, using app-privkey and a decryption algorithm that corresponds to the encryption algorithm used to encrypt the block of data at block 1340. Third party app server(s) 125 uses a same hash algorithm, used in block 1335, to determine the hash of the block of data that includes app-ID, SID, srcIP, srcPort, dstIP, and dstPort. FIG. 14B depicts third party app server(s) 125 indexing 1430 the app server DB 130 with the app-ID to retrieve app-privkey, and decrypting 1432 {SID, HMAC}app-pubkey using the app-privkey. FIG. 14B further shows third party app server(s) 125 determining 1435 the hash of a block of data that includes app-ID, SID, srcIP, srcPort, dstIP, dstPort (HMAC {app-ID, SID, srcIP, srcPort, dstIP, dstPort}). Third party app server(s) 125 compares the determined hash HMAC from block 1365 with the decrypted HMAC from the received and decrypted HMAC of block 1360 (FIG. 13C, block 1370). FIG. 14B shows third party app server(s) 125 comparing 1437 the determined hash HMAC {app-ID, SID, srcIP, srcPort, dstIP, dstPort} with the decrypted hash HMAC to determine if the two match.

If the comparison indicates a match, third party app server(s) 125 creates a session token {TOKEN} for the third party mobile app 155 (block 1375). Third party app server(s) 125 compares the determined HMAC of block 1365 with the decrypted HMAC of block 1360 (received from mobile device 105 in block 1350) to determine if the two hashes match. Matching the two hashes indicates a successful VISP authentication and that third party app server(s) 125 may grant a session token to mobile device 105 such that mobile device 105 can access third party app server(s) 125 via server APIs. FIG. 14B depicts third party app server(s) 125 creating 1440 a session token {TOKEN} for third party mobile app 155 of mobile device 105. Third party app server(s) 125 sends a message with the session token {TOKEN} to third party mobile app 155 at mobile device 105 (block 1380), and third party mobile app 155 at mobile device 105 subsequently accesses third party app server(s) 125 via server APIs using the received session token {TOKEN} (block 1385). FIG. 14B shows third party app server(s) 125 sending a message 1442, that includes the session token {TOKEN}, to mobile device 105. As can be seen in FIG. 14B, the message 1442 may be received at enforcement server(s) 110 and forwarded to mobile device 105. FIG. 14B further depicts third party mobile app 155 at mobile device 105 accessing 1445 third party app server(s) 125 with the session token {TOKEN} via server APIs. At the start of a session between third party mobile app 155 and third party app server(s) 125, third party app server(s) 125 receives the session token {TOKEN} from third party mobile app 155, identifies the particular session, and grants third party mobile app 155 access to particular data stored at, and/or functionality performed at, third party app server(s) 125.

The exemplary process of FIGS. 13A-13C may be executed for each new API access attempt of third party app server(s) 125 by a third party mobile app 155 at a mobile device 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 9A-9C, 11A, 11B, and 13A-13C, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by an authentication device from an application executing at a mobile device, a first request for an authentication token, wherein the first request includes an application identifier that is assigned to the application and a destination network device, and an encrypted session identifier (SID) that uniquely identifies a network connection session originated from the application executing at the mobile device and with the destination network device, and wherein the SID is encrypted using a first public key, of a first public/private key pair, assigned to an owner of the destination network device;
    retrieving, by the authentication device from a stored data structure using the application identifier, a first private key of the first public/private key pair assigned to the owner of the destination network device, and a second public key of a second public/private key pair assigned to the application identifier;
    decrypting, by the authentication device using the first private key of the first public/private key pair, the encrypted SID to produce a decrypted SID;
    determining, by the authentication device, a first hash value of certain data, wherein the certain data includes the application identifier and session information associated with the network connection session;
    encrypting, by the authentication device using the second public key of the second public/private key pair assigned to the application identifier, the determined first hash value and the decrypted SID to produce the requested authentication token comprising the encrypted first hash value and the SID; and
    sending, by the authentication device, a message including the application identifier and the requested authentication token to the application at the mobile device.

2. The method of claim 1, further comprising:
attempting, by the application executing at the mobile device, to access the destination network device, via a network, wherein the access attempt includes the application identifier;
generating, by the destination network device based on the access attempt by the application, the SID;
encrypting, by the destination network device, the SID with the first public key of the first public/private key pair assigned to the owner of the destination network device to produce the encrypted SID; and
sending, via the network, the encrypted SID to the application at the mobile device.

3. The method of claim 1, further comprising:
sending, by the application executing at the mobile device subsequent to receipt of the authentication token comprising the encrypted first hash value and the SID, a session request to the destination network device, wherein the session request includes the application identifier and the authentication token;
decrypting, by the destination network device using a second private key of the second public/private key pair assigned to the application identifier, the authentication token to produce a decrypted first hash value and SID;
creating, by the destination network device, a session token based on the decrypted first hash value and SID; and
sending the session token to the application to enable the application to access, and to engage in the network connection session with, the destination network device.

4. The method of claim 3, wherein the creating the session token based on the decrypted first hash value and SID comprises:
determining, by the destination network device, a second hash value of the application identifier, the decrypted SID, and the session information; and
comparing, at the destination network device, the second hash value with the decrypted first hash value,
wherein the creating the session token is further based on the comparison of the second hash value with the decrypted first hash value.

5. The method of claim 4, wherein comparing the second hash value with the decrypted first hash value further comprises:
determining, by the destination network device, if the second hash value matches the decrypted first hash value,
wherein the session token is created if the second hash value matches the decrypted first hash value.

6. The method of claim 1, wherein the session information includes a first network address associated with the mobile device and a second network address associated with the destination network device.

7. The method of claim 1, further comprising:
receiving, at a provisioning portal from the owner of the destination network device, the second public key of the second public/private key pair, a public key certificate, and a network address associated with the destination network device;
creating, at the provisioning portal, the application identifier for identifying the application; and
sending, from the provisioning portal, to the authentication device, a second request for the first public key of the first public/private key pair, wherein the second request includes the application identifier, the second public key of the second public/private key pair, the public key certificate and the network address associated with the destination network device.

8. The method of claim 7, further comprising:
validating, at the authentication device, the public key certificate;
if the validation of the public key certificate is successful, generating the first public/private key pair assigned to the owner of the destination device, comprising the first public key and the first private key, for the application identifier; and
sending, by the authentication device, the first public key to the provisioning portal.

9. The method of claim 8, further comprising:
sending, from the provisioning portal, the first public key to the destination network device.

10. A system, comprising:
an authentication device configured to:
receive, from an application executing at a mobile device, a first request for an authentication token, wherein the first request includes an application identifier that is assigned to the application and a destination network device, and an encrypted session identifier (SID that uniquely identifies a network connection session originated from the application executing at the mobile device and with the destination network device, and wherein the SID is encrypted using a first public key of a first public/private key pair assigned to an owner of the destination network device,
retrieve, from a stored data structure using the application identifier, a first private key of the first public/private key pair assigned to the owner of the destination network device, and a second public key of a second public/private key pair assigned to the application identifier,
decrypt, using the first private key of the first public/private key pair, the encrypted SID to produce a decrypted SID,
determine a hash value of certain data, wherein the certain data includes the application identifier and session information associated with the network connection session,
encrypt, using the second public key of the second public/private key pair assigned to the application identifier, the determined hash value and the decrypted SID to produce the requested authentication token, and
send a message including the application identifier and the requested authentication token to the application at the mobile device.

11. The system of claim 10, further comprising:
the destination network device, configured to:
generate, based on an access attempt by the application executing at the mobile device, the SID, wherein the access attempt includes the application identifier,
encrypt the SID with the first public key of the first public/private key pair assigned to the owner of the destination network device to produce the encrypted SID, and
send the encrypted SID to the application at the mobile device.

12. The system of claim 10, further comprising:
the mobile device, configured to:
send, by the application subsequent to receipt of the authentication token, a session request to the destination network device, wherein the session request includes the application identifier and the authentication token comprising the encrypted hash value and the SID; and the destination network device is further configured to:
- decrypt, using a second private key of the second public/private key pair assigned to the application identifier, the authentication token to produce a decrypted first hash value and SID;
- create a session token based on the decrypted hash value and SID; and
- send the session token to the application to enable the application to access, and to engage in the network connection session with, the destination network device.

13. The system of claim 12, wherein, when creating the session token based on the decrypted hash value and SID, the destination network device is further configured to:
- determine a second hash value of the application identifier, the decrypted SID, and the session information;
- compare the second hash value with the decrypted hash value; and
- create the session token based further on the comparison of the second hash value with the decrypted hash value.

14. The system of claim 13, wherein, when comparing the second hash value with the decrypted hash value, the destination network device is further configured to:
- determine if the second hash value matches the decrypted hash value, and
- create the session token if the second hash value matches the decrypted hash value.

15. The system of claim 10, wherein the session information includes a first network address associated with the mobile device and a second network address associated with the destination network device.

16. The system of claim 10, further comprising:
a provisioning portal device, configured to:
- receive, from the owner of the destination network device, the second public key of the second public/private key pair, a public key certificate, and a network address associated with the destination network device,
- create the application identifier for identifying the application, and
- send, to the authentication device, a second request for the first public key of the first public/private key pair, wherein the second request includes the application identifier, the second public key of the second public/private key pair, the public key certificate and the network address associated with the destination network device.

17. The system of claim 16, wherein the authentication device is further configured to:
- validate the public key certificate;
- if the validation of the public key certificate is successful, generate the first public/private key pair, comprising the first public key and the first private key assigned to the owner of the destination device, for the application identifier; and
- send the first public key to the provisioning portal device.

18. The system of claim 17, wherein the provisioning portal device is further configured to:
- send the first public key to the destination network device.

19. A non-transitory storage medium storing instructions executable by a computational device, wherein the instructions comprise instructions to:
- receive, at an authentication device from an application at a mobile device, a request for an authentication token, wherein the request for the authentication token includes an application identifier that is assigned to the application and a destination network device, and an encrypted session identifier (SID that uniquely identifies a network connection session originated from the application executing at the mobile device and with the destination network device, and wherein the SID is encrypted using a first public key of a first public/private key pair assigned to an owner of the destination network device;
- retrieve, from a stored data structure using the application identifier, a first private key of the first public/private key pair assigned to the owner of the destination network device, and a second public key of a second public/private key pair assigned to the application identifier;
- decrypt, using the first private key of the first public/private key pair, the encrypted SID to produce a decrypted SID;
- determine a hash value of certain data, wherein the certain data includes the application identifier and session information associated with the network connection session;
- encrypt, using the second public key of the second public/private key pair assigned to the application identifier, the determined hash value and the decrypted SID to produce the requested authentication token; and
- cause a message including the application identifier and the requested authentication token to be sent to the application at the mobile device.

20. The non-transitory storage medium of claim 19, wherein the session information includes a first Internet Protocol (IP) network address associated with the mobile device and a second IP network address associated with the destination network device.

* * * * *